(12) United States Patent
Jino et al.

(10) Patent No.: US 10,281,359 B2
(45) Date of Patent: May 7, 2019

(54) MISFIRE DETERMINATION DEVICE

(71) Applicant: Kawasaki Jukogyo Kabushiki Kaisha, Kobe-shi, Hyogo (JP)

(72) Inventors: Kenichi Jino, Himeji (JP); Katsumi Sobakiri, Takatsuki (JP); Shinichi Kuratani, Kobe (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 123 days.

(21) Appl. No.: 15/516,245

(22) PCT Filed: Oct. 1, 2015

(86) PCT No.: PCT/JP2015/005009
§ 371 (c)(1),
(2) Date: Mar. 31, 2017

(87) PCT Pub. No.: WO2016/051806
PCT Pub. Date: Apr. 7, 2016

(65) Prior Publication Data
US 2017/0299468 A1    Oct. 19, 2017

(30) Foreign Application Priority Data

Oct. 1, 2014    (JP) ................................ 2014-203436

(51) Int. Cl.
*G01M 15/11*        (2006.01)
*F02D 41/14*        (2006.01)
(Continued)

(52) U.S. Cl.
CPC ......... *G01M 15/11* (2013.01); *F02D 41/0097* (2013.01); *F02D 41/1497* (2013.01);
(Continued)

(58) Field of Classification Search
CPC ... G01M 15/11; G01M 15/04; F02D 41/0097; F02D 41/1497; F02D 2200/101;
(Continued)

(56) References Cited

U.S. PATENT DOCUMENTS 5,044,195 A * 9/1991 James ................ F02D 41/1497
73/114.05
5,574,217 A    11/1996 McCombie
(Continued)

FOREIGN PATENT DOCUMENTS

JP         3546565 B2    7/2004
JP       2009235950 A   10/2009
JP       2014109248 A    6/2014

OTHER PUBLICATIONS

ISA Japan Patent Office, International Search Report Issued in Application No. PCT/JP2015/005009, dated Dec. 22, 2015, WIPO, 1 page.
(Continued)

Primary Examiner — Freddie Kirkland, III
(74) Attorney, Agent, or Firm — Alleman Hall Creasman & Tuttle LLP

(57) ABSTRACT

A misfire determination device of an engine in which explosion occurs at unequal intervals, the engine including a plurality of cylinders and a crankshaft which is angularly displaced at a different angle between expansion strokes, is configured to calculate generated torque correlation amount correlated with generated torque, based on an angular position signal of the crankshaft, and perform misfire determination, based on an average value of the generated torque correlation amount in an interval less than one cycle of the engine, at an angular position of the crankshaft which is different from an angular position of the crankshaft at an ignition timing.

6 Claims, 10 Drawing Sheets

(51) Int. Cl.
*F02P 17/12* (2006.01)
*F02D 41/00* (2006.01)
*F02D 41/30* (2006.01)
*G01M 15/04* (2006.01)

(52) U.S. Cl.
CPC .............. *F02P 17/12* (2013.01); *F02D 41/30* (2013.01); *F02D 2200/101* (2013.01); *F02D 2200/1002* (2013.01); *F02D 2200/1015* (2013.01); *F02D 2250/14* (2013.01); *F02P 2017/128* (2013.01); *G01M 15/04* (2013.01)

(58) Field of Classification Search
CPC ......... F02D 2200/1002; F02D 2250/14; F02D 2200/1015; F02D 41/30; F02P 17/12; F02P 2017/128
See application file for complete search history.

(56) References Cited

U.S. PATENT DOCUMENTS

| | | | |
|---|---|---|---|
| 9,194,316 B2* | 11/2015 | Miyamoto | .......... F02D 41/0085 |
| 10,054,061 B2* | 8/2018 | Tsukahara | ................. F02D 9/02 |
| 2016/0333801 A1* | 11/2016 | Tsukahara | ................. F02D 9/02 |
| 2018/0128712 A1* | 5/2018 | Jino | ....................... G01M 15/11 |

OTHER PUBLICATIONS

ISA Japan Patent Office, Written Opinion Issued in Application No. PCT/JP2015/005009, dated Dec. 22, 2015, WIPO, 4 pages.

* cited by examiner $\omega'(\theta), \omega'_{AVE}(\theta)$ : Instantaneous value in normal state, Average value in normal state
$\omega'_{AVE}(\theta), \omega_{AVE}(\theta)$ : Instantaneous value in misfire state, Average value in misfire state
$D_{(\#)}$ : Determination threshold

| $\omega'(\theta)$: | Instantaneous value in normal state |
| $\omega'_{AVE(\theta)}$: | Average value in normal state |
| $\omega(\theta)$: | Instantaneous value in misfire state |
| $\omega_{AVE(\theta)}$: | Average value in misfire state |
| $D_{(\#)}$: | Determination threshold |

$\omega'_{AVE(\theta)}$ : Average value in normal state
$\omega_{AVE(\theta)}$ : Average value in misfire state

MISFIRE DETERMINATION DEVICE

TECHNICAL FIELD

The present invention relates to a misfire determination device of an engine in which explosion occurs at unequal (irregular) intervals.

BACKGROUND ART

Conventionally, automobiles for which quietness of engine behaviors is regarded as important, include engines in which explosion occurs at equal (regular) intervals. The engine in which explosion occurs at equal intervals commonly uses a method in which a physical amount (e.g., an angular acceleration rate, rotational speed) indicating a decrease amount of an engine speed due to occurrence of a misfire is measured at a next time point of the normal ignition of a misfire cylinder (at a time point immediately before the normal ignition), and it is determined whether or not the misfire has occurred in the cylinder at this time point (see e.g., Patent Literature 1 or the like). In the engine in which explosion occurs at equal intervals, the decrease amount of an instantaneous angular velocity of a crankshaft between a normal (non-misfire) state (a state in which no misfire has occurred) and a misfire state (a state in which the misfire has occurred) becomes greatest, at a time point immediately before the next timing of normal ignition. Therefore, it is determined whether or not the misfire has occurred in the cylinder based on the decrease amount of the instantaneous angular velocity of the crankshaft at a time point immediately before the ignition timing.

CITATION LIST

Patent Literature

Patent Literature 1: Japanese Patent No. 3546565

SUMMARY OF INVENTION

Technical Problem

In an exemplary motorcycle in which various engine performances are regarded as important, an engine in which explosion occurs at unequal (irregular) intervals, is used, instead of the engine in which explosion occurs at equal intervals. In the engine in which explosion occurs at unequal (irregular) intervals, however, at a time point immediately before the ignition timing, the decrease amount of the instantaneous angular velocity of the crankshaft does not become great in some cases. For this reason, there exists a problem that it cannot be accurately determined whether or not the misfire has occurred in the cylinder of the engine in which explosion occurs at unequal intervals, by use of the conventional misfire determination method for the engine in which explosion occurs at equal intervals.

In view of the above-described circumstances, an object of the present invention is to accurately determine whether or not the misfire has occurred in the engine in which explosion occurs at unequal (irregular) intervals.

Solution to Problem

According to an aspect of the present invention, there is provided a misfire determination device of an engine in which explosion occurs at unequal intervals, the engine including a plurality of cylinders and a crankshaft which is angularly displaced at a different angle between expansion strokes, the misfire determination device being configured to calculate a generated torque correlation amount correlated with generated torque, based on an angular position signal of the crankshaft, and perform misfire determination, based on an average value of the generated torque correlation amount in an interval less than one cycle of the engine, at an angular position of the crankshaft which is different from an angular position of the crankshaft at an ignition timing.

In accordance with this configuration, in the misfire determination performed in the engine in which explosion occurs at unequal (irregular) intervals, the average value of the generated torque correlation amount correlated with the generated torque is used instead of an instantaneous value of the generated torque correlation amount. Therefore, the effects of the explosion at unequal intervals, on the cylinder, can be suppressed, and the misfire determination can be accurately performed. For example, the average value of the angular velocity is used as the average value of the generated torque correlation amount. The amount of decrease in the average value of the angular velocity which occurs due to occurrence of the misfire is greater than that of the instantaneous value of the angular velocity. Also, by using the average value of the angular velocity, the misfire determination can be performed at a common crank angle.

In the engine in which explosion occurs at unequal (irregular) intervals, a change pattern of the average value of the generated torque correlation amount in the misfire state is different depending on a difference in the crank angle interval between the expansion stroke of the cylinder which is the misfire determination target cylinder (the cylinder for which the misfire determination is to be performed) and the expansion stroke of another cylinder which occurs subsequently to the expansion stroke of the misfire determination target cylinder. Specifically, in the engine in which explosion occurs at unequal intervals, the decrease amount of the average value of the generated torque correlation amount does not sometimes become great at a time point immediately before the ignition timing. For this reason, it cannot be accurately determined whether or not the misfire has occurred in the cylinder of the engine in which explosion occurs at unequal intervals, by use of the conventional misfire determination method for the engine in which explosion occurs at equal intervals. In view of this, in the above-described aspect, an object may be to set an optimal misfire determination angle corresponding to each of the plurality of cylinders depending on the difference in the crank angle interval between the expansion strokes, to accurately determine occurrence of the misfire.

The angular position of the crankshaft at which the misfire determination is performed may be set for each of the plurality of cylinders for which the misfire determination is to be performed, and angular positions corresponding to the plurality of cylinders, respectively, may have values different from each other.

In accordance with this configuration, the optimal misfire determination angle corresponding to each of the plurality of cylinders can be set depending on the difference in the crank angle interval between the expansion strokes, and the accuracy of the misfire determination can be improved.

The angular position of the crankshaft at which the misfire determination is performed may be set to be smaller as a crank angle interval between the expansion strokes is smaller.

In the engine in which explosion occurs at unequal (irregular) intervals, there is a tendency that a time point when a difference between the average value of the generated torque correlation amount after occurrence of the misfire and the average value of the generated torque correlation amount after occurrence of non-misfire (normal ignition) is maximum becomes earlier (is advanced), as the crank angle interval between the expansion stroke of the cylinder which is the misfire determination target cylinder and the subsequent expansion stroke of another cylinder is smaller (decreases). In accordance with the above-described configuration, the optimal misfire determination angle can be set depending on the decrease in the crank angle interval between the expansion strokes, and the accuracy of the misfire determination can be improved.

A threshold to be compared to the average value of the generated torque correlation amount may be set for each of the plurality of cylinders for which the misfire determination is to be performed, and thresholds corresponding to the plurality of cylinders may have values different from each other.

In the engine in which explosion occurs at unequal intervals, the decrease amount of the average value of the generated torque correlation amount in the misfire state (the state in which the misfire has occurred) is different between the cylinders, depending on the difference in the crank angle interval between the expansion strokes. In accordance with the above-described configuration, the optimal determination threshold corresponding to each of the plurality of cylinders can be set depending on the decrease amount of the average value of the generated torque correlation amount in the misfire state, and the accuracy of the misfire determination can be improved.

The misfire determination device may be configured to determine that misfire has occurred, in a case where the average value of the generated torque correlation amount at the misfire determination is equal to or less than the threshold, and the threshold may be set to be greater as a crank angle interval between the expansion strokes is smaller.

In the engine in which explosion occurs at unequal (irregular) intervals, in a case where the crank angle interval between the expansion stroke of the misfire determination target cylinder and the subsequent expansion stroke of another cylinder is small, a difference between the average value of the generated torque correlation amount in the non-misfire state and the average value of the generated torque correlation amount in the misfire state is small. For this reason, if the threshold is set to a small value, namely, a value close to the average value of the generated torque correlation amount in the misfire state, then the average value of the generated torque correlation amount easily exceeds the threshold under an influence of noises, even in the case of the misfire (even in a case where the misfire has occurred), and it is erroneously determined that no misfire has occurred in the cylinder. However, in accordance with the above-described configuration, the threshold is set to be greater as the crank angle interval between the expansion strokes is smaller. Therefore, the average value of the generated torque correlation amount easily falls below the threshold, in the misfire state, and accuracy of the misfire determination is not degraded.

In the engine in which explosion occurs at unequal (irregular) intervals, a change pattern of the average value of the generated torque correlation amount in the misfire state is different depending on a difference in the crank angle interval between the expansion stroke of the misfire determination target cylinder (the cylinder for which the misfire determination is to be performed) and the expansion stroke of another cylinder which occurs subsequently to the expansion stroke of the misfire determination target cylinder. Specifically, in the engine in which explosion occurs at unequal intervals, the decrease amount of the average value of the generated torque correlation amount does not sometimes become great at a time point immediately before the ignition timing. For this reason, it becomes necessary to design the misfire determination program corresponding to the change pattern of each cylinder, which increases a design load compared to the conventional misfire determination method for the engine in which explosion occurs at equal intervals. In view of this, in the above aspect, an object may be to reduce the design load while realizing accurate misfire determination, in the engine in which explosion occurs at unequal intervals.

The angular position of the crankshaft at which the misfire determination is performed may be set to be equal between the plurality of cylinders.

In accordance with the above-described configuration, in the misfire determination program, the misfire determination angle can be set to an equal value for all of the plurality of cylinders (the misfire determination angle common to the cylinders is set). This makes it possible to reduce the design load while realizing accurate misfire determination.

The inventors discovered that at the angular position of the crankshaft at which a reference value obtained by averaging the generated torque correlation amount in one cycle is equal to the average value of the generated torque correlation amount in an interval less than one cycle, in the non-misfire state, a sufficient difference between the average value of the generated torque correlation amount in the non-misfire state and the average value of the generated torque correlation amount in the misfire state can be stably secured.

The misfire determination device may be configured to perform the misfire determination, at the angular position of the crankshaft at which a reference value obtained by averaging the generated torque correlation amount in one cycle is equal to the average value of the generated torque correlation amount in the interval less than one cycle, in a non-misfire state.

In accordance with the above-described configuration, by calculating the crank angle at which the average value of the generated torque correlation amount in one cycle is equal to the average value of the generated torque correlation amount in the interval less than one cycle, in the non-misfire, the misfire determination angle at which the threshold determination can be accurately performed can be easily decided. As a result, it becomes possible to suitably reduce the design load.

The misfire determination device may be configured to determine that misfire has not occurred in a case where the average value of the generated torque correlation amount in the interval less than one cycle of the engine increases in a predetermined interval of the angular position of the crankshaft after ignition, and that the misfire has occurred in a case where the average value of the generated torque correlation amount in the interval less than one cycle of the engine decreases in the predetermined interval of the angular position of the crankshaft after the ignition.

In accordance with this configuration, in a case where no misfire has occurred, the value associated with the angular velocity after the ignition increases in the predetermined interval, while in a case where the misfire has occurred, the value associated with the angular velocity after the ignition decreases in the predetermined interval. Since the misfire determination can be easily performed depending on whether a determination parameter has a negative value or a positive value. This can eliminate a need to set the threshold for each engine.

Advantageous Effects of the Invention

In accordance with the present invention, it becomes possible to obtain an advantage in that occurrence of misfire in an engine in which explosion occurs at unequal intervals can be detected accurately.

DESCRIPTION OF EMBODIMENTS

Hereinafter, embodiments will be described with reference to the drawings.

Embodiment 1

[Engine Control System]

Figure 1:
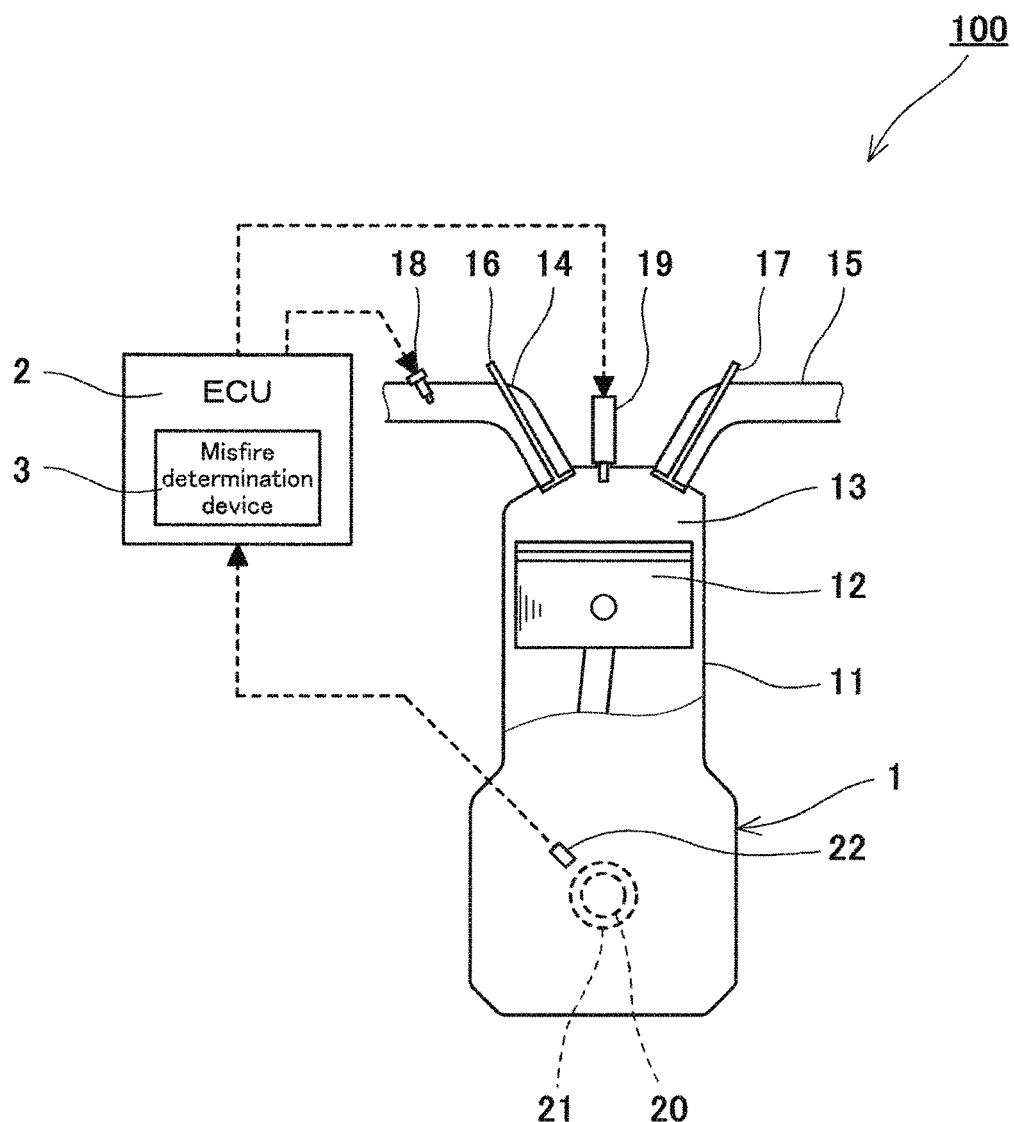
FIG. 1 is a view showing the configuration of an engine control system including a misfire determination device according to Embodiment 1.

FIG. 1 is a view showing the configuration of an engine control system including a misfire determination device according to Embodiment 1. As shown in FIG. 1, an engine control system 100 includes an engine 1, and an electronic control unit (ECU) 2 including a misfire determination device 3. In FIG. 1, broken lines indicate flows of control signals.

The engine 1 includes a plurality of cylinders 11, and is an engine in which explosion occurs at unequal (irregular) intervals and a crankshaft 20 is angularly displaced at a different angle between expansion strokes. In the present embodiment, the engine 1 is a V-type four-cylinder cylinder or an inline four-cylinder engine with four cylinders arranged in a straight line in a longitudinal direction. Although only one of the four cylinders is shown in the example of FIG. 1, the remaining three cylinders (not shown) have the same configuration.

A piston 12 is reciprocatingly inserted into each of the plurality of cylinders 11. A combustion chamber 13 is formed above the piston 12. An air-intake pipe 14 is connected to the combustion chamber 13 via an intake valve 16. An exhaust pipe 15 is connected to the combustion chamber 13 via an exhaust valve 17. A fuel injection valve 18 which injects a fuel is provided inside the air-intake pipe 14, for each of the plurality of cylinders 11. In addition, a throttle valve (not shown) and a pressure sensor (not shown) are provided inside the air-intake pipe 14. The combustion chamber 13 is provided with an ignition plug 19 which ignites and combusts an air-fuel mixture.

The piston 12 inserted into the cylinder 11 is coupled to a crankshaft 20 which is an output shaft. A rotation detection rotor 21 is mounted on the crankshaft 20. A crank angle sensor 22 is disposed in the vicinity of the rotation detection rotor 21. The crank angle sensor 22 is configured to output to the ECU 2 a crank angle signal of a pulse form indicating the angular position (crank angle) of the crankshaft 20 every time the crankshaft 20 rotates a predetermined angle. Further, a cylinder identification sensor (not shown) is provided for each of the plurality of cylinders 11. The cylinder identification sensor is configured to output to the ECU 2 one pulse as a cylinder identification signal when a particular cylinder 11 is at a top dead center. Based on this signal, the ECU 2 can detect that the particular cylinder 11 is at the top dead center.

The ECU 2 includes a processor including ROM, RAM, and the like, and an input/output interface. The crank angle sensor 22, the cylinder identification sensor, and sensors for detecting the running state of the engine 1 are connected to an input section of the ECU 2. The fuel injection valve 18, the ignition plug 19, and actuators for controlling the running state of the engine 1 are connected to an output section of the ECU 2. The ECU 2 drives the actuators according to specified programs to control the running state of the engine 1.

[Misfire Determination Device]

Figure 2:
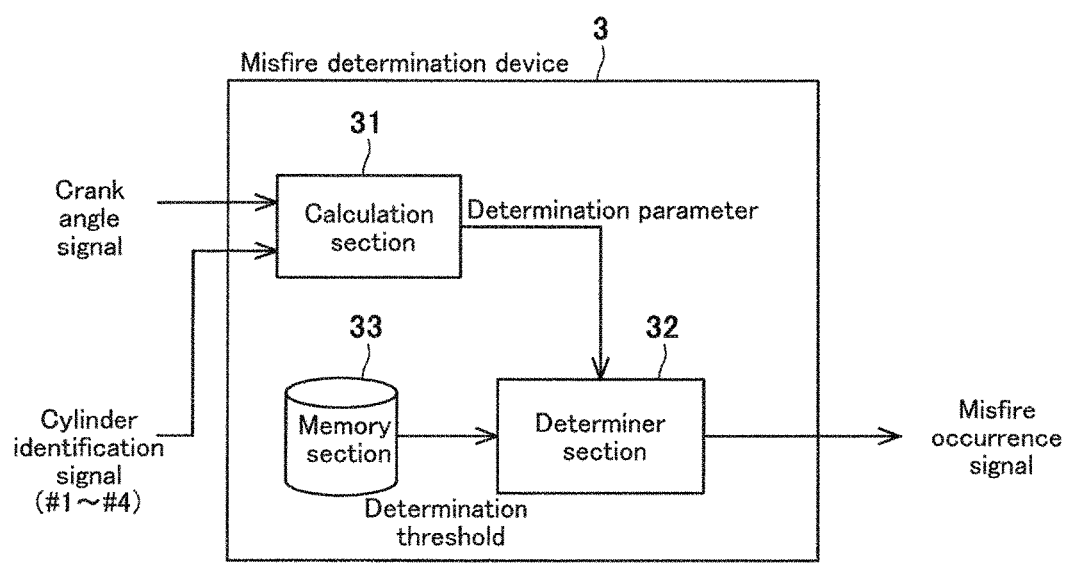
FIG. 2 is a block diagram showing the configuration of the misfire determination device of FIG. 1.

In the present embodiment, the ECU 2 includes the misfire determination device 3 which determines whether or not misfire has occurred in each of the plurality of cylinders 11 of the engine 1. The misfire determination device 3 is implemented by executing a misfire determination program contained in the processor of the ECU 2. FIG. 2 is a block diagram showing the configuration of the misfire determination device 3. As shown in FIG. 2, the misfire determination device 3 includes a calculation section 31, a determiner section 32, and a memory section 33. These sections are functional blocks implemented by running the misfire determination program by the ECU 2.

The calculation section 31 calculates a generated torque correlation amount correlated with generated torque by use of an angular position signal (hereinafter this will be referred to as a crank angle signal) of the crankshaft 20. In the present embodiment, the generated torque correlation amount is the angular velocity of the crankshaft 20. The cylinder identification signal used to identify the cylinder 11 which is a misfire determination target cylinder (the cylinder 11 for which the misfire determination is to be performed), and the crank angle signal are input to the calculation section 31.

The calculation section 31 calculates the crank angle, an instantaneous value of the angular velocity of the crankshaft 20, and an average value of the angular velocity of the crankshaft 20. The calculation section 31 calculates the crank angle and the instantaneous value of the angular velocity of the crankshaft 20, from a passage tine (pulse width) of the crank angle signal output every time the crankshaft 20 rotates, for example, 15 degrees. The calculation section 31 calculates the average value of the angular velocity from a past passage time of, for example, 180 degrees.

The determiner section 32 determines whether or not the misfire has occurred (performs the misfire determination) based on an average value of the generated torque correlation amount in an interval which is less than one cycle of the engine 1, at the angular position (misfire determination angle) of the crankshaft 20 which is different from the angular position of the crankshaft 20 at an ignition timing. More specifically, the determiner section 32 derives the average value of the generated torque correlation amount in the interval less than one cycle of the engine 1 so that a change in the generated torque correlation amount within one cycle is reflected on the average value, and determines whether or not the misfire has occurred, based on this average value. In the present embodiment, the determiner section 32 determines whether or not the misfire has occurred based on the average value of the angular velocity of the crankshaft 20 (hereinafter this will be simply referred to as the average value of the angular velocity) in the interval of 180 degrees. The average value of the angular velocity is used as a determination parameter used in the misfire determination. In a case where the determiner section 32 determines that the misfire has occurred, it outputs a misfire occurrence signal.

The memory section 33 contains for each of the plurality of cylinders 11, the misfire determination angle, and a determination threshold to be compared to the determination parameter, at the misfire determination angle.

[Principle of Misfire Determination]

Next, a principle of misfire determination performed by the misfire determination device 3 of the present embodiment will be described. FIGS. 3A to 3D are graphs showing a relation between the angular velocity and the crank angle in a normal state (non-misfire state) (no misfire has occurred) and a misfire state (a state in which the misfire has occurred). In FIGS. 3A to 3D, broken lines indicate the instantaneous values of the angular velocities, while solid lines indicate the average values of the angular velocities. θ indicates the crank angle. $\omega'_{(\theta)}$ indicates the instantaneous value of the angular velocity in the normal (non-misfire) state. $\omega'_{AVE(\theta)}$ indicates the average value of the angular velocity in the normal state. $\omega_{(\theta)}$ indicates the instantaneous value of the angular velocity in the misfire state. $\omega_{AVE(\theta)}$ indicates the average value of the angular velocity in the misfire state. $D_{(\#)}$ indicates the determination threshold.

In each of first to fourth cylinders 11 (#1 to #4), one combustion cycle including four strokes which are intake, compression, expansion and exhaust is performed successively in cycles of 720 degrees. The expansion stroke occurs at unequal (irregular) intervals successively, among the cylinders 11.

In the present embodiment, the engine 1 is an engine in which explosion occurs at unequal (irregular) intervals, in which the crank angle θ of the crankshaft 20 which is angularly displaced between the expansion strokes is different.

Figure 3A:
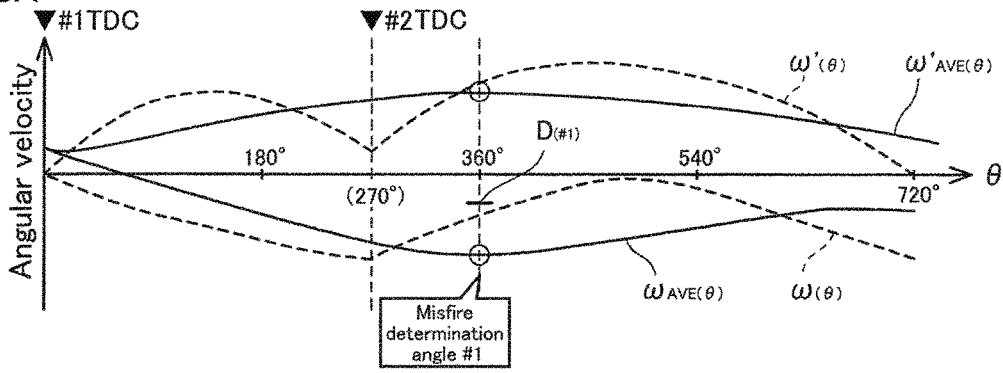
FIGS. 3A to 3D are graphs showing a relation between an angular velocity and a crank angle of an engine (V-type four cylinder engine or inline four-cylinder engine with four cylinders arranged in a straight line in a longitudinal direction) of FIG. 1.

FIG. 3A indicates as a reference the crank angle in a state in which the first cylinder (#1) is at a top dead center. In this example, a crank angle interval from ignition of the first cylinder (#1) to ignition of the second cylinder (#2) is 270 degrees.

Figure 3B:
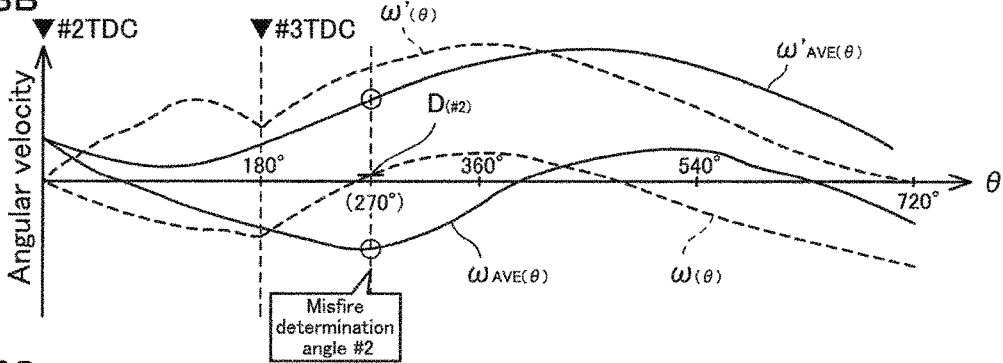

FIG. 3B indicates as a reference the crank angle in a state in which the second cylinder (#2) is at the top dead center. In this example, a crank angle interval from ignition of the second cylinder (#2) to ignition of the third cylinder (#3) is 180 degrees.

Figure 3C:
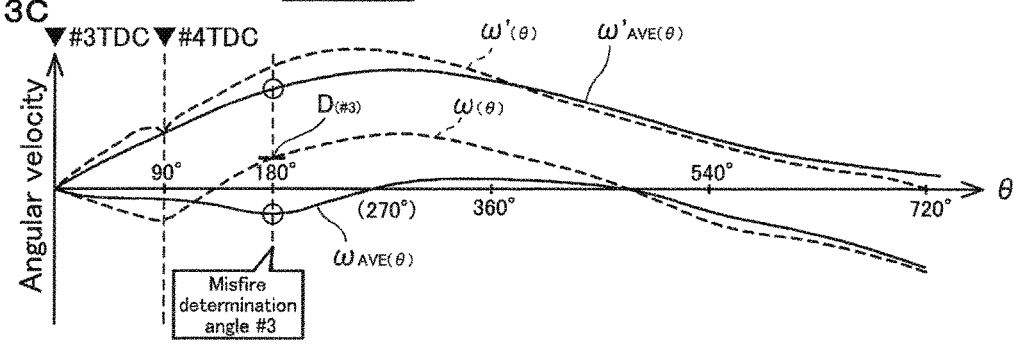

FIG. 3C indicates as a reference the crank angle in a state in which the third cylinder (#3) is at the top dead center. In this example, a crank angle interval from ignition of the third cylinder (#3) to ignition of the fourth cylinder (#4) is 90 degrees.

Figure 3D:
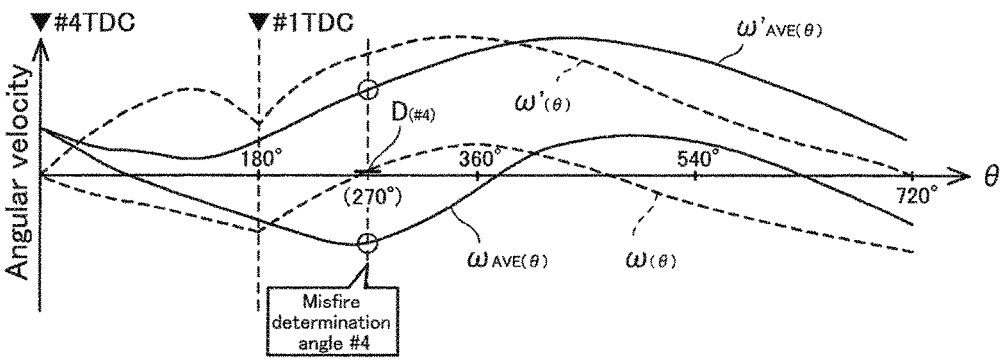

FIG. 3D indicates as a reference the crank angle in a state in which the fourth cylinder (#4) is at the top dead center. In this example, a crank angle interval from ignition of the fourth cylinder (#4) to ignition of the first cylinder (#1) is 180 degrees.

As can be seen from FIGS. 3A to 3D, in the engine 1 of the present embodiment, a change pattern of the average value $\omega_{AVE(\theta)}$ of the angular velocity in the misfire state is different depending on a difference in the crank angle interval between the expansion stroke of the cylinder which is the misfire determination target cylinder (the cylinder for which the misfire determination is to be performed) and the expansion stroke of another cylinder which occurs subsequently to the expansion stroke of the misfire determination target cylinder. In the engine 1 in which explosion occurs at unequal (irregular) intervals, the decrease amount of the average value $\omega_{AVE(\theta)}$ of the angular velocity does not become great at a time point immediately before the timing (time point) of the ignition. For this reason, it cannot be accurately determined whether or not the misfire has occurred in the cylinder of the engine in which explosion occurs at unequal intervals, by use of the conventional misfire determination method for the engine in which explosion occurs at equal intervals. In view of this, an optimal misfire determination angle corresponding to each cylinder 11 is set depending on the difference in the crank angle interval between the expansion strokes, to accurately determine occurrence of the misfire.

In the present embodiment, the angular positions (misfire determination angles) of the crankshaft 20, at which the misfire determination is performed, are set to correspond to the plurality of cylinders 11, respectively, for which the misfire determination is to be performed. The angular positions are set to different values. As used herein, the angular position (misfire determination angle) of the crankshaft 20 at which the misfire determination is performed is an angle with respect to the angle of the crankshaft 20 as a reference (zero point) corresponding to the top dead center or ignition timing of the cylinder 11 which is the misfire determination target cylinder. In other words, the angular position (misfire determination angle) of the crankshaft 20 at which the misfire determination is performed means an angular interval between the angle of the crankshaft 20 corresponding to the top dead center or ignition timing of the cylinder 11 as the misfire determination target cylinder, and the angle of the crankshaft 20 at a timing (time point) at which the misfire determination is performed.

In a case where the misfire determination target cylinder is the first cylinder (#1), as shown in FIG. 3A, the crank angle interval between the ignition of the first cylinder (#1) and the ignition of the second cylinder (#2) is 270 degrees.

In this case, the misfire determination angle (#1) of the first cylinder (#1) is set to 360 degrees.

In a case where the misfire determination target cylinder is the second cylinder (#2), as shown in FIG. 3B, the crank angle interval between the ignition of the second cylinder (#2) and the ignition of the third cylinder (#3) is 180 degrees. In this case, the misfire determination angle (#2) of the second cylinder (#2) is set to 270 degrees.

In a case where the misfire determination target cylinder is the third cylinder (#3), as shown in FIG. 3C, the crank angle interval between the ignition of the third cylinder (#3) and the ignition of the fourth cylinder (#4) is 90 degrees. In this case, the misfire determination angle (#3) of the third cylinder (#3) is set to 180 degrees.

In a case where the misfire determination target cylinder is the fourth cylinder (#4), as shown in FIG. 3D, the crank angle interval between the ignition of the fourth cylinder (#4) and the ignition of the first cylinder (#1) is 180 degrees. In this case, the misfire determination angle (#4) of the fourth cylinder (#4) is set to 270 degrees.

As described above, in the engine in which explosion occurs at unequal (irregular) intervals, there is a tendency that a time point when a difference between the average value $\omega_{AVE(\theta)}$ of the angular velocity after occurrence of the misfire and the average value $\omega'_{AVE(\theta)}$ of the angular velocity after occurrence of the non-misfire (normal ignition) is maximum becomes earlier (is advanced), as the crank angle interval between the expansion stroke of the misfire determination target cylinder and the subsequent expansion stroke of another cylinder is smaller (decreases). In view of this, the intervals of the misfire determination angles (#1, #2, #3, #4) are set so that the interval of the misfire determination angle is smaller as the crank angle interval between the expansion strokes is smaller.

In the present embodiment, the determination parameter used in the misfire determination is the average value $\omega_{AVE(\theta)}$ of the angular velocity at the misfire determination angle. In the engine in which explosion occurs at unequal (irregular) intervals, a decrease amount of the average value $\omega_{AVE(\theta)}$ of the angular velocity in the misfire state is varied between the cylinders 11, depending on the difference in the crank angle interval between the expansion strokes. For this reason, the thresholds to be compared to the average values $\omega_{AVE(\theta)}$ of the angular velocities as the determination parameters are set to correspond to the cylinders 11, respectively, for which the misfire determination is to be performed. The thresholds have different values.

Specifically, in a case where the misfire determination target cylinder is the first cylinder (#1), as shown in FIG. 3A, a determination threshold $D_{(\#1)}$ is set at the misfire determination angle (#1) of 360 degrees. The determination threshold $D_{(\#1)}$ is compared to the average value $\omega_{AVE(\theta)}$ of the angular velocity as the determination parameter. In the misfire determination, it is determined that the misfire has occurred when the average value $\omega_{AVE(270)}$ of the angular velocity is equal to or less than the determination threshold $D_{(\#1)}$, as indicated by the following formula (1):

$$\omega_{AVE(360)} \leq D_{(\#1)} \quad (1)$$

In a case where the misfire determination target cylinder is the second cylinder (#2), as shown in FIG. 3B, a determination threshold $D_{(\#2)}$ is set at the misfire determination angle (#2) of 270 degrees. The determination threshold $D_{(\#2)}$ is compared to the average value $\omega_{AVE(270)}$ of the angular velocity as the determination parameter. In the misfire determination, it is determined that the misfire has occurred when the average value $\omega_{AVE(270)}$ of the angular velocity is equal to or less than the determination threshold $D_{(\#2)}$, as indicated by the following formula (2):

$$\omega_{AVE(360)} \leq D_{(\#2)} \quad (2)$$

In a case where the misfire determination target cylinder is the third cylinder (#3), as shown in FIG. 3C, a determination threshold $D_{(\#3)}$ is set at the misfire determination angle (#3) of 180 degrees. The determination threshold $D_{(\#3)}$ is compared to the average value $\omega_{AVE(180)}$ of the angular velocity as the determination parameter. In the misfire determination, it is determined that the misfire has occurred when the average value $\omega_{AVE(180)}$ of the angular velocity is equal to or less than the determination threshold $D_{(\#3)}$, as indicated by the following formula (3):

$$\omega_{AVE(180)} \leq D_{(\#3)} \quad (3)$$

In a case where the misfire determination target cylinder is the fourth cylinder (#4), as shown in FIG. 3D, a determination threshold $D_{(\#4)}$ is set at the misfire determination angle (#4) of 270 degrees. The determination threshold $D_{(\#4)}$ is compared to the average value $\omega_{AVE(270)}$ of the angular velocity as the determination parameter. In the misfire determination, it is determined that the misfire has occurred when the average value $\omega_{AVE(270)}$ of the angular velocity at the misfire determination is equal to or less than the determination threshold $D_{(\#4)}$, as indicated by the following formula (4):

$$\omega_{AVE(270)} \leq D_{(\#4)} \quad (4)$$

As can be seen from FIG. 3A, in a case where the crank angle interval between the expansion stroke of the first cylinder (#1) as the misfire determination target cylinder and the subsequent expansion stroke of another cylinder (#2) is large (270 degrees), a difference between the average value $\omega'_{AVE(\theta)}$ of the angular velocity in the non-misfire state and the average value $\omega_{AVE(360)}$ of the angular velocity in the misfire state is large. For this reason, if the determination threshold $D_{(\#1)}$ of the first cylinder (#1) is set to a large value, namely, a value close to the average value $\omega_{AVE(360)}$ of the angular velocity in the normal state, then the average value $\omega_{AVE(360)}$ of the angular velocity easily falls below the threshold under an influence of noises, even in the case of the normal state, and it is erroneously determined that the misfire has occurred in the first cylinder 11 (#1).

In contrast, as can be seen from FIG. 3C, in a case where the crank angle interval between the expansion stroke of the cylinder (#3) as the misfire determination target cylinder and the subsequent expansion stroke of another cylinder (#4) is small (90 degrees), a difference between the average value $\omega'_{AVE(\theta)}$ of the angular velocity in the non-misfire state and the average value $\omega_{AVE(\theta)}$ of the angular velocity in the misfire state is small. For this reason, if the determination threshold $D_{(\#3)}$ of the third cylinder (#3) is set to a small value, namely, a value close to the average value $\omega_{AVE(180)}$ of the angular velocity in the misfire state, then the average value $\omega_{AVE(180)}$ of the angular velocity easily exceeds the threshold under an influence of noises, even in the case of the misfire state (even in a case where the misfire has occurred), and it is erroneously determined that no misfire has occurred in the third cylinder (#3).

In light of the above, the determination thresholds set to correspond to the cylinders 11, respectively (the determination thresholds individually set for the cylinders 11), in the formulas (1) to (4), are set so that the determination threshold is greater as the crank angle interval between the expansion strokes is smaller. In the present embodiments, the magnitudes of the determination thresholds corresponding to the cylinders 11, respectively, are set as follows:

$$D_{(\#3)} > D_{(\#2)} = D_{(\#4)} > D_{(\#1)} \quad (5)$$

Although in the present embodiment, the determination threshold $D_{(\#2)}$ of the second cylinder and the determination threshold $D_{(\#4)}$ of the fourth cylinder are set to an equal value, they may be set to different values.

[Misfire Determination Process]

Figure 4A:
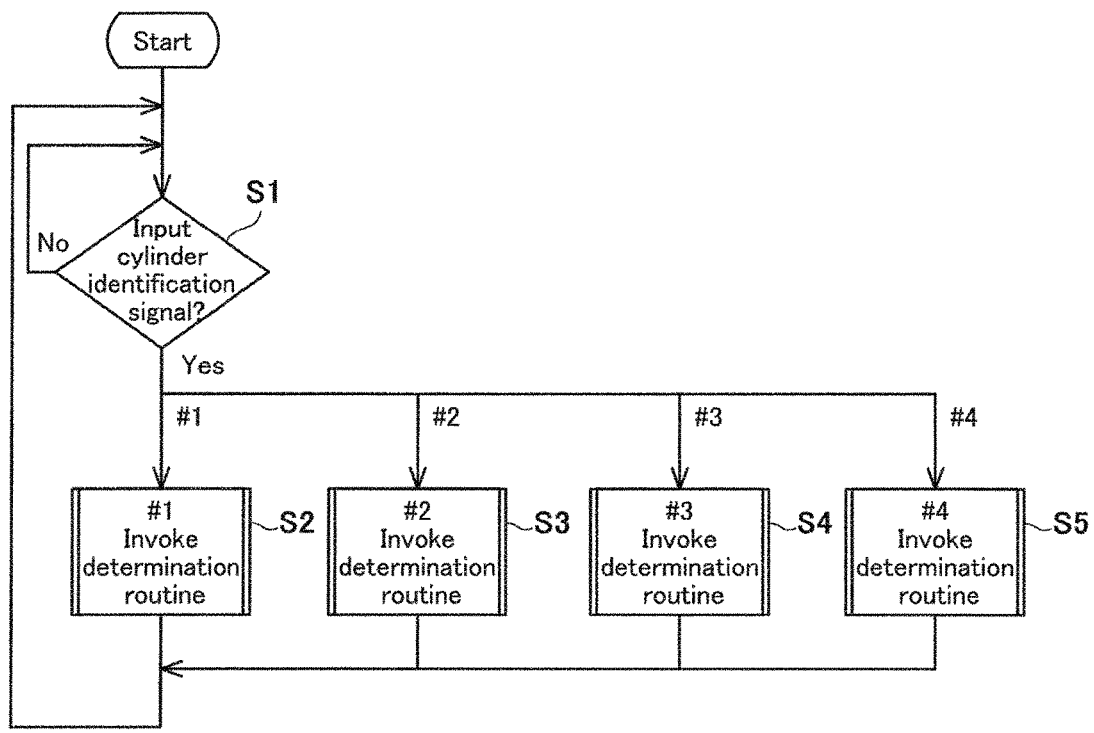
FIGS. 4A and 4B are flowcharts showing a misfire determination process performed by the misfire determination device of FIG. 2.
Figure 4B:
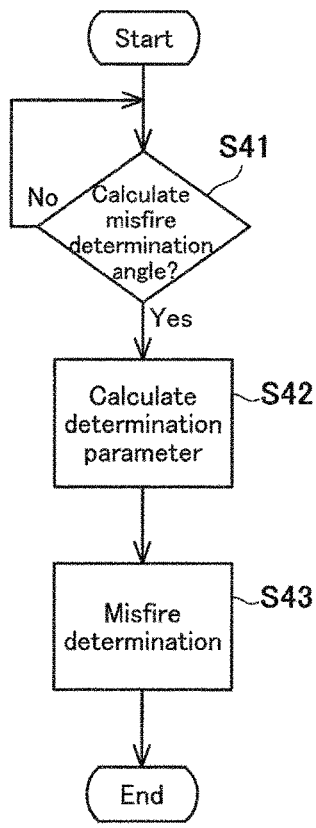

Next, the misfire determination process performed by the misfire determination device 3 of the present embodiment will be described with reference to the flowcharts of FIGS. 4A and 4B. FIG. 4A is the flowchart of a main program, and FIG. 4B is a flowchart of a sub-routine (misfire determination program). Prior to execution of the main program, the misfire determination angles corresponding to the cylinders 11, respectively, and the determination thresholds corresponding to the cylinders 11, respectively, are pre-stored in the memory section 33. In this example, the misfire determination angles (#1, #2) of the cylinders 11, the determination threshold $D_{(\#1)}$ of the first cylinder, the determination threshold $D_{(\#2)}$ of the second cylinder, the determination threshold $D_{(\#3)}$ of the third cylinder, and the determination threshold $D_{(\#4)}$ of the fourth cylinder are stored in the memory section 33.

Initially, as shown in FIG. 4A, the calculation section 31 identifies the cylinder 11 as the determination target cylinder, based on a cylinder identification signal input, after running of the engine 1 has started (step S1). Then, every time the cylinder identification signal is input, the misfire determination process for the cylinder 11 as the misfire determination target cylinder at that point of time is performed as an interruption process (one of Steps S2, S3, S4, and S5). In other words, while the main program is executed, the sub-routine corresponding to the cylinder 11 identified as the misfire determination target cylinder is invoked, and the misfire determination process is initiated.

Now, the misfire determination process for the first cylinder 11 (#1) will be described. As shown in FIG. 4B, the calculation section 31 calculates the misfire determination angle (#1) (step S41). The calculation section 31 counts pulses of the crank angle signal received from the crank angle sensor 22, and calculates the crank angle (θ) with respect to the crank angle at the top dead center of the first cylinder 11 (#1), as a reference. In addition, the calculation section 31 calculates the instantaneous value $\omega_{(\theta)}$ of the angular velocity and the average value $\omega_{AVE(\theta)}$ of the angular velocity of the crankshaft 20, based on the crank angle signal. The calculation section 31 calculates the instantaneous value of the angular velocity, from a passage time (pulse width) of the crank angle output every time the crankshaft 20 rotates, for example, 15 degrees. In a case where the crank angle (θ) of the first cylinder 11 (#1) has reached the misfire determination angle (#1) 360 degrees, the calculation section 31 moves to a next step.

Then, the calculation section 31 calculates the determination parameter at the misfire determination angle (#1) 360 degrees of the first cylinder 11 (#1) (step S41). The determination parameter is the average value $\omega_{AVE(360)}$ of the angular velocity, at the misfire determination angle (#1) 360 degrees of the first cylinder 11 (#1).

Then, the determiner section 32 determines whether or not the misfire has occurred in the first cylinder 11 (#1) (step S43). The determiner section 32 compares the average value $\omega_{AVE(360)}$ angular velocity as the determination parameter to the determination threshold $D_{(\#1)}$, at the misfire determination angle (#1). In a case where the average value $\omega_{AVE(360)}$ of the angular velocity at the misfire determination is equal to or less than the determination threshold $D_{(\#1)}$, the determiner section 32 determines that the misfire has occurred in the first cylinder 11 (#1). On the other hand, in a case where the average value $\omega_{AVE(360)}$ of the angular velocity at the misfire determination is greater than the determination threshold $D_{(\#1)}$, the determiner section 32 determines that the first cylinder 11 (#1) is in the normal state (no misfire has occurred in the first cylinder 11 (#1)).

After the misfire determination, the calculation section 31 terminates the misfire determination process, returns to step S1 of the main program of FIG. 4A, and waits for a next cylinder identification signal to be input to the calculation section 31. In a case where the calculation section 31 identifies another cylinder (#2~#4) as the misfire determination target cylinder in step S1, processing similar to the above-described step S41 to step S43 is performed for this cylinder 11.

As described above, in the present embodiment, the misfire determination angles are set to correspond to the plurality of cylinders 11, respectively, the calculation section 31 calculates the determination parameter (the average value $\omega_{AVE(\theta)}$ of the angular velocity), at the misfire determination angle prestored in the memory section 33, and the determiner section 32 compares the determination parameter (the average value $\omega_{AVE(\theta)}$ of the angular velocity) to the determination threshold $D_{(\#)}$ of the cylinder 11 prestored in the memory section 33, to determine whether or not the misfire has occurred in the cylinder 11. Specifically, in a case where the determination parameter (the average value $\omega_{AVE(\theta)}$ of the angular velocity) is equal to or less than the determination threshold $D_{(\#)}$, the determiner section 32 determines that the misfire has occurred in the cylinder 11.

In accordance with the present embodiment, in the misfire determination of the engine in which explosion occurs at unequal (irregular) intervals, the average value $\omega_{AVE(\theta)}$ of the angular velocity is used as the average value of the generated torque correlation amount. Since the decrease amount of the average value $\omega_{AVE(\theta)}$ of the angular velocity due to occurrence of the misfire is greater than that of the instantaneous value $\omega_{(\theta)}$ of the angular velocity, the effects of the explosion at unequal intervals, on the cylinder 11, can be suppressed, and the misfire determination can be accurately performed.

The misfire determination angles (#1, #2, #3, #4) are set to correspond to the cylinders 11, respectively, for which the misfire determination is to be performed, and their angular positions have the different values. Therefore, it becomes possible to set the optimal misfire determination angle for each of the plurality of cylinders 11, according to the difference in the crank angle interval between the expansion strokes, and perform the misfire determination with a higher accuracy.

The misfire determination angles (#1, #2, #3, #4) are set so that the misfire determination angle is smaller as the crank angle interval between the expansion strokes is smaller. This makes it possible to set an optimal misfire determination angle according to a decrease in the crank angle interval between the expansion strokes and perform the misfire determination with a higher accuracy.

The determination thresholds $D_{(\#)}$ to be compared to the average values $\omega_{AVE(\theta)}$ of the angular velocities as the determination parameters, respectively, are set to correspond to the cylinders 11, respectively, for which the misfire determination is to be performed, and have different values. Therefore, it becomes possible to set the optimal determination threshold $D_{(\#)}$ for each of the cylinders 11, according to the difference in the decrease amount of the average value $\omega_{AVE(\theta)}$ of the angular velocity in the misfire state, and perform the misfire determination with a higher accuracy.

Further, in a case where the average value $\omega_{AVE(\theta)}$ of the angular velocity at the misfire determination is equal to or less than the determination threshold $D_{(\#)}$, the determiner section 32 determines that the misfire has occurred in the cylinder 11, and the determination thresholds $D_{(\#)}$ are set so that the determination threshold $D_{(\#)}$ is greater as the crank angle interval between the expansion strokes is smaller. This makes it possible to prevent degradation of the accuracy of the misfire determination even when the crank angle interval between the expansion strokes is small.

Modified Example

Although in the present embodiment, the determination parameter used to perform the misfire determination is the average value of the angular velocity in the interval less than one cycle, the determination parameter may be, for example, a difference $\omega_{DIFF(\theta)}$ between an average value $\omega_{FILT\theta}$ of the angular velocity in one cycle in a previous normal state and the average value $\omega_{AVE(\theta)}$ of the angular velocity in the interval less than one cycle at the misfire determination, or an absolute value $|\omega_{DIFF(\theta)}|$ of the difference $\omega_{DIFF(\theta)}$.

Further, the determination parameter used to perform the misfire determination may be a change rate of the average value $\omega_{AVE(\theta)}$ of the angular velocity in a proper interval, namely, an angular acceleration rate $\beta_{(\theta)}$ or an absolute value $|\beta_{(\theta)}|$ of the angular acceleration rate $\beta_{(\theta)}$.

Further, the determination threshold $D_{(\theta)}$ may be decided for each of the cylinders 11 with respect to a previous normal value as the reference (the average value $\omega_{AVE(\theta)}$ of the angular velocity in the interval of 180 degrees) at the misfire determination angle. Or, an average value (average value in one cycle) of the angular velocity, in a period longer than the interval of 180 degrees may be calculated and the determination threshold $D_{(\theta)}$ may be decided with respect to this average value as the reference.

In the case of the engine in which explosion occurs at unequal (irregular) intervals, a deviation of the average value of the angular velocity in a shorter period (e.g., 180 degrees interval) from the average value of the angular velocity in a longer period (e.g., one cycle interval) is varied depending on a change in the crank angle. In view of this, the deviation of the average value of the angular velocity in the shorter period corresponding to the change in the crank angle in the normal state may be stored in the memory section 33, and the determiner section 32 may determine that the misfire has occurred, in a case where a deviation between the stored deviation of the average value of the angular velocity in the shorter period in the normal state and the deviation of the average value of the angular velocity in the shorter period at the misfire determination is equal to or greater than a predetermined value.

In this case, the determination parameter $\delta$ is represented by the following formula (1-1):

$$\delta = |\omega'_{FILT(\theta)} - \omega_{AVE(\theta)}| - |\omega'_{FILT(\theta)} - \omega'_{AVE(\theta)}| \qquad (1\text{-}1)$$

$\omega_{AVE(\theta)}$ indicates the average value of the angular velocity in the shorter period which is measured at the misfire determination. $\omega'_{AVE(\theta)}$ indicates the average value of the angular velocity in the shorter period which was measured in, for example, in a previous normal state. $\omega'_{FILT(\theta)}$ indicates the average value of the angular velocity in the longer period which was measured in, for example, in the previous normal state. The average value of the angular velocity in the "shorter period" refers to the average value in the interval of 180 degrees. In contrast, it is sufficient that the average value of the angular velocity in the "longer period" is longer than at least the interval of the average value of the angular velocity in the "shorter period", and may be the average value in the interval of 720 degrees (one cycle). In the misfire determination, the determiner section 32 may determine that the misfire has occurred, in a case where the determination parameter $\delta$ is greater than a predetermined threshold D, and determine that the cylinder 11 is in the normal (non-misfire) state in a case where the determination parameter $\delta$ is equal to or less than the predetermined threshold D.

Further, the determiner section 32 may determine whether or not the misfire has occurred, by comparing to the threshold D a deviation between the average value $\omega_{FILT(\theta)}$ of the angular velocity in the longer period which was measured in the previous normal state, and the average value $\omega_{AVE(\theta)}$ of the angular velocity which is measured at the misfire determination (the misfire determination angle).

The determiner section 32 may determine whether or not the misfire has occurred, by comparing to the threshold D a deviation between the average value $\omega'_{AVE(\theta)}$ of the angular velocity obtained in the non-misfire state, and the average value $\omega_{AVE(\theta)}$ of the angular velocity measured, at the misfire determination (the misfire determination angle). In this case, the determination parameter $\delta$ is represented by, for example, the following formula (1-2):

$$\delta = \omega_{AVE(\theta)} - \omega'_{AVE(\theta)} \qquad (1\text{-}2)$$

Further, each of the misfire determination angles (#1, #2, #3, #4) may be set to an angle corresponding to a maximum deviation between the average value of the angular velocity in the normal state and the average value of the angular velocity at the misfire determination, or an angle corresponding to a maximum deviation between the average value in the longer period (e.g., in one cycle) and the average value of the angular velocity at the misfire determination.

The misfire determination angle may be made different between the cylinders for which the misfire determination is to be performed, and the threshold D used to perform the misfire determination may be made different between the cylinders. In this case, the different thresholds D corresponding to the cylinders 11, respectively, are stored in the memory section 33.

The average value $\omega_{AVE(\theta)}$, $\omega'_{AVE(\theta)}$ of the angular velocity (or the average value of the angular velocity in the shorter period) may be the average value in an angular interval less than 360 degrees, preferably less than 270 degrees, and more preferably equal to or less than 180 degrees, instead of the average value in the interval of 180 degrees. Also, although "the average value of the angular velocity in the longer period" is the average value in the interval of 720 degrees (one cycle), "the average value of the angular velocity in the longer period" may be the average value in an angular interval which is equal to or greater than 540 degrees and less than 720 degrees.

Moreover, the engine 1 is not limited to the V-type four-cylinder engine or the inline four-cylinder engine with the four cylinders arranged in the straight line in the longitudinal direction, and may be engines of other forms.

Embodiment 2

Next, Embodiment 2 will be described. Hereinafter, the constituents which are the same as those of embodiment 1 will not be described, and differences from Embodiment 1 will be mainly described.

[Principle of Misfire Determination]

Figure 5A:
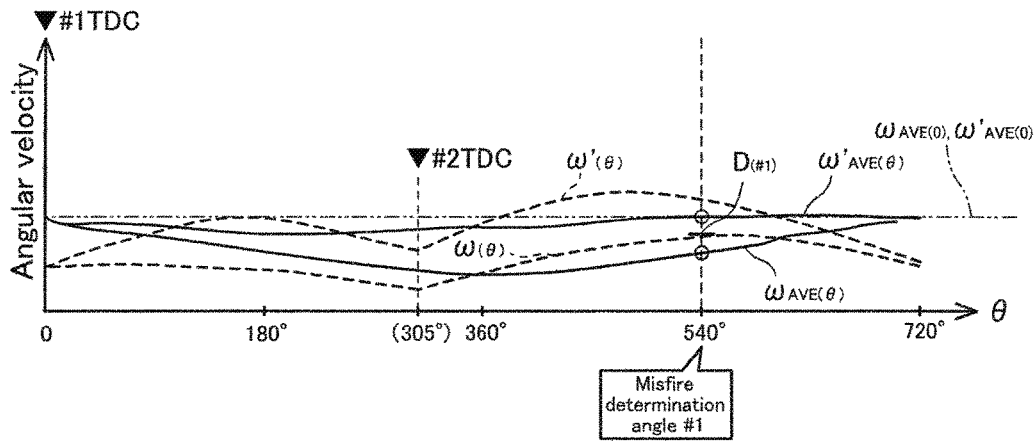
FIGS. 5A and 5B are graphs showing a relation between an angular velocity and a crank angle of an engine (V-type two-cylinder engine) according to Embodiment 2.
Figure 5B:
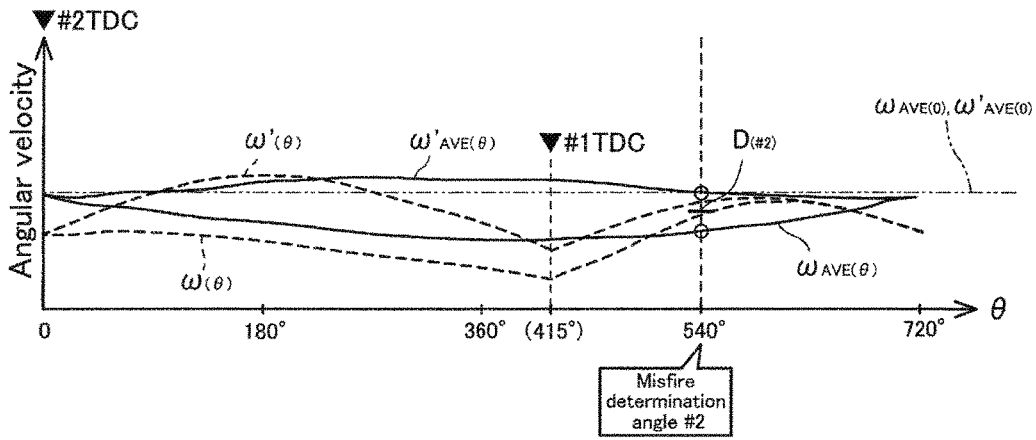

Initially, the principle of the misfire determination performed by a misfire determination according to Embodiment 2 will be described. FIGS. 5A and 5B are graphs each showing a relation between the crank angle and the angular velocity in the normal state (non-misfire state) and in the misfire state, in the engine in which explosion occurs at unequal (irregular) intervals, according to the present embodiment. In FIGS. 5A and 5B, broken lines indicate the instantaneous values of the angular velocities, while solid lines indicate the average values of the angular velocities. $\omega'_{AVE(\theta)}$ indicates the instantaneous value of the angular velocity in the normal state. $\omega'_{AVE(\theta)}$ indicates the average value of the angular velocity in the normal state. $\omega_{(\theta)}$ indicates the instantaneous value of the angular velocity in the misfire state. $\omega_{AVE(\theta)}$ indicates the average value of the angular velocity in the misfire state. $D_{(\#)}$ indicates the determination threshold.

In each of the first and second cylinders 11 (#1, #2), one combustion cycle including four strokes which are intake, compression, expansion and exhaust is performed successively in cycles of 720 degrees. The expansion stroke occurs at unequal intervals between the cylinders 11.

In the present embodiment, the engine 1 is an engine in which explosion occurs at unequal intervals, in which the crank angle θ of the crankshaft 20 which is angularly displaced between the expansion strokes is different. In the present embodiment, the engine 1 is a V-type two-cylinder engine.

FIG. 5A indicates as a reference the crank angle in a state in which the first cylinder (#1) is at the top dead center. In this example, a crank angle interval from ignition of the first cylinder (#1) to ignition of the second cylinder (#2) is 305 degrees.

FIG. 5B indicates as a reference the crank angle in a state in which the second cylinder (#2) is at the top dead center. In this example, a crank angle interval from ignition of the second cylinder (#2) to ignition of the first cylinder (#1) is 415 degrees.

As can be seen from FIGS. 5A and 5B, in the engine in which explosion occurs at unequal (irregular) intervals, of the present embodiment, a change pattern of the average value $\omega_{AVE(\theta)}$ of the angular velocity in the misfire state is different depending on a difference in the crank angle interval between the expansion stroke of the misfire determination target cylinder (the cylinder for which the misfire determination is to be performed) and the expansion stroke of another cylinder which occurs subsequently to the expansion stroke of the misfire determination target cylinder. In the engine 1 in which explosion occurs at unequal intervals, the decrease amount of the average value $\omega_{AVE(\theta)}$ of the angular velocity does not become great at a time point immediately before the ignition timing. For this reason, it becomes necessary to design the misfire determination program corresponding to the change pattern of each cylinder 11 as in Embodiment 1, which increases design load compared to the conventional misfire determination method for the engine in which explosion occurs at equal intervals. In view of this, an object is to be reduce the design load while realizing accurate misfire determination, in the engine in which explosion occurs at unequal intervals.

The inventors discovered that with reference to the change patterns of FIGS. 5A and 5B, at an angular position θ of the crankshaft at which the average value $\omega_{AVE(\theta)}$ or $\omega'_{AVE(\theta)}$ of the angular velocity corresponding to the top dead center of each cylinder 11 is equal to the average value $\omega_{AVE(\theta)}$ of the angular velocity in the non-misfire state, a sufficient difference between the average value $\omega'_{AVE(\theta)}$ of the angular velocity in the non-misfire state and the average value $\omega_{AVE(\theta)}$ of the angular velocity in the misfire state can be stably secured.

Based on this, each of the misfire determination angle of the first cylinder (#1) and the misfire determination angle of the second cylinder (#2) is set to the angular position θ of the crankshaft at which the average value $\omega_{AVE(\theta)}$ or $\omega'_{AVE(\theta)}$ of the angular velocity corresponding to the top dead center of each cylinder 11 is equal to the average value $\omega'_{AVE(\theta)}$ of the angular velocity in the non-misfire state (normal state).

In the present embodiment, the misfire determination angle of the first cylinder (#1) and the misfire determination angle of the second cylinder (#2) are set to an equal value between the cylinders 11 for which the misfire determination is to be performed. As shown in FIG. 5A, in a case where the crank angle interval from ignition of the first cylinder (#1) to ignition of the second cylinder (#2) is 305 degrees, the misfire determination angle #1 of the first cylinder (#1) is set to 540 degrees. As shown in FIG. 5B, in a case where the crank angle interval from ignition of the second cylinder (#2) to ignition of the third cylinder (#3) is 415 degrees, the misfire determination angle #2 of the second cylinder (#2) is also set to 540 degrees.

In the present embodiment, the determination parameter $\beta_{(\theta)}$ in the misfire determination is the angular acceleration rate in a range of the crank angle 0 to θ, as represented by the following formula (6):

$$\beta_{(\theta)} = (\omega_{AVE(\theta)} - \omega_{AVE(0)})/T_{(\theta)} \qquad (6)$$

$\omega_{AVE(\theta)}$ indicates the average value of the angular velocity corresponding to the crank angle θ of zero (the crank angle corresponding to the top dead center of the misfire determination cylinder). $T_{(\theta)}$ indicates time that passes from the top dead center of each cylinder 11 (#1, #2) to the misfire determination angle (#1, #2).

In a case where the misfire determination target cylinder is the first cylinder (#1), as shown in FIG. 5A, the determination threshold $D_{(\#1)}$ is set at 540 degrees which is the misfire determination angle (#1) of the first cylinder (#1). The determination threshold $D_{(\#1)}$ is compared to the determination parameter $\beta_{(540)}$. The determination threshold $D_{(\#1)}$ of the first cylinder (#1) is set with respect to the angular velocity $\beta_{(540)}$ in the normal state, as the reference. In the misfire determination, the determiner section 32 determines that the misfire has occurred in the first cylinder (#1) in a case where the determination parameter $\beta_{(540)}$ is less than the determination threshold $D_{(\#1)}$, as represented by the following formula (7):

$$\beta_{(540)} < D_{(\#1)} \qquad (7)$$

In a case where the misfire determination target cylinder is the second cylinder (#2), as shown in FIG. 5B, the determination threshold $D_{(\#2)}$ is set at 540 degrees which is the misfire determination angle (#2) of the second cylinder (#2). The determination threshold $D_{(\#2)}$ is compared to the determination parameter $\beta_{(540)}$. The determination threshold $D_{(\#2)}$ of the second cylinder (#2) is set with respect to the angular velocity $\beta_{(540)}$ in the normal state, as the reference. In the misfire determination, the determiner section 32 determines that the misfire has occurred in the second cylinder(#2) in a case where the determination parameter $\beta_{(540)}$ is less than the determination threshold $D_{(\#2)}$, as represented by the following formula (8):

$$\beta_{(540)} < D_{(\#2)} \qquad (8)$$

[Misfire Determination Process]

Figure 6A:
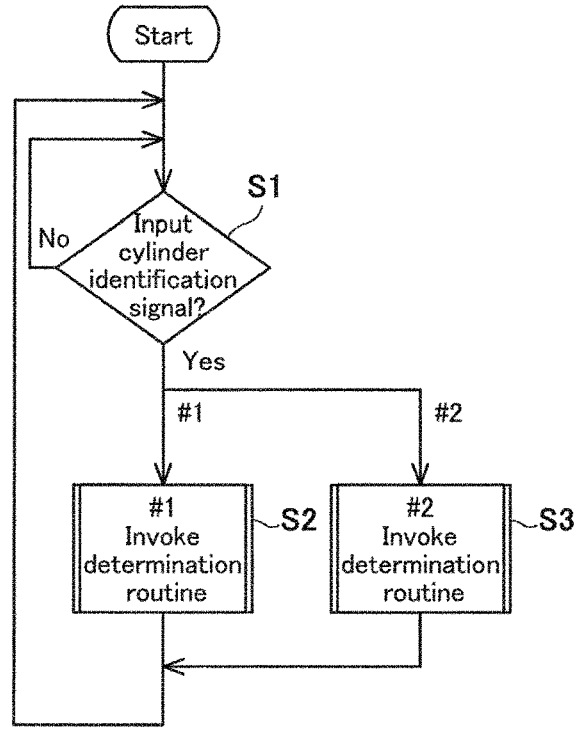
FIGS. 6A and 6B are flowcharts showing a misfire determination process performed by a misfire determination device of FIG. 5.
Figure 6B:
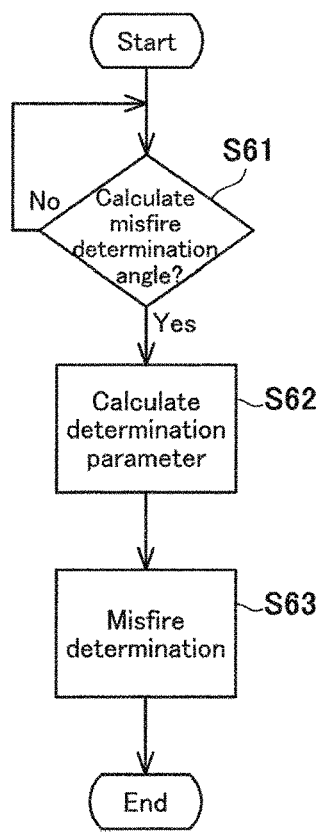

Next, the misfire determination process performed by the misfire determination device 3 of the present embodiment will be described with reference to the flowcharts of FIGS. 6A and 6B. FIG. 6A is the flowchart of a main program, and FIG. 6B is a flowchart of a sub-routine (misfire determination program). Prior to execution of the main program, the misfire determination angles (#1, #2) common to the cylinders 11, the determination threshold $D_{(\#1)}$ of the first cylinder, and the determination threshold $D_{(\#2)}$ of the second cylinder are pre-stored in the memory section 33.

Initially, as shown in FIG. 6A, the calculation section 31 identifies the cylinder 11 as the determination target cylinder, based on a cylinder identification signal input, after running of the engine 1 has started (step S1). Then, every time the cylinder identification signal is input, the misfire determination process for the cylinder 11 as the misfire determination target cylinder is performed as an interruption process (step S2 or step S3). In other words, while the main program is executed, the sub-routine corresponding to the cylinder 11 identified as the misfire determination target cylinder is invoked, and the misfire determination process is initiated.

Now, the misfire determination process for the first cylinder 11 (#1) will be described. As shown in FIG. 6B, the calculation section 31 calculates the misfire determination angle (#1) (step S61). The calculation section 31 counts pulses of the crank angle signal received from the crank angle sensor 22, and calculates the crank angle (θ) with respect to the crank angle at the top dead center of the identified first cylinder 11 (#1), as the reference. In addition, the calculation section 31 calculates the average value $\omega_{AVE(\theta)}$ of the angular velocity of the crankshaft 20 based on the crank angle signal. The calculation section 31 calculates the average value of the angular velocity, from a passage time (pulse width) of the crank angle output every time the crankshaft 20 rotates 360 degrees. At a time point when the crank angle (θ) of the first cylinder 11 (#1) has reached the misfire determination angle (#1) 540 degrees, the calculation section 31 moves to a next step (see FIG. 5A). In the present embodiment, the misfire determination angle (#1) of the first cylinder 11 (#1) and the misfire determination angle (#2) of the second cylinder 11 (#2) are set to an equal value.

Then, the calculation section 31 calculates the determination parameter $\beta_{(540)}$ at the misfire determination angle (#1) 540 degrees of the first cylinder 11 (#1) (step S62). The determination parameter $\beta_{(540)}$ is the angular acceleration rate, at the misfire determination angle (#1) 540 degrees of the first cylinder 11 (#1), as indicated by the formula (6).

Then, the determiner section 32 determines whether or not the misfire has occurred in the first cylinder 11 (#1) (step S63). The determiner section 32 compares the angular acceleration rate which is the determination parameter $\beta_{(540)}$ to the determination threshold $D_{(\#1)}$, at the misfire determination angle (#1). In a case where the determination parameter $\beta_{(540)}$ is less than the determination threshold $D_{(\#1)}$, the determiner section 32 determines that the misfire has occurred in the first cylinder 11 (#1). On the other hand, in a case where the determination parameter $\beta_{(540)}$ is equal to or greater than the determination threshold $D_{(\#1)}$, the determiner section 32 determines that the first cylinder 11 (#1) is in the normal state (non-misfire state).

After the misfire determination, the calculation section 31 terminates the misfire determination process, returns to step S1 of the main program of FIG. 6A, and waits for a next cylinder identification signal to be input to the calculation section 31. In a case where the calculation section 31 identifies the second cylinder (#2) as the misfire determination target cylinder in step S1, processing similar to the above-described step S61 to step S63 is performed for the second cylinder (#2).

As described above, in the present embodiment, the misfire determination angles corresponding to the cylinders 11 are set to an equal value (the misfire determination angle common to the cylinders 11 is set). During running of the engine 11, the calculation section 31 calculates the determination parameter $\beta_{(\theta)}$ at the misfire determination angle prestored in the memory section 33, for the misfire determination target cylinder 11, and the determiner section 32 compares the determination parameter $\beta_{(\theta)}$ to the determination threshold $D_{(\#)}$ of the cylinder 11 which is prestored in the memory section 33, to determine whether or not the misfire has occurred in the cylinder 11.

In accordance with the present embodiment, in the misfire determination of the engine in which explosion occurs at unequal (irregular) intervals, the angular acceleration rate is used as the average value of the generated torque correlation amount. Since the decrease amount of the angular acceleration rate due to occurrence of the misfire is greater than that of the instantaneous value $\omega_{(\theta)}$ of the angular velocity, the effects of the explosion at unequal intervals, on the cylinder 11, can be suppressed, and the misfire determination can be accurately performed.

By calculating crank angle θ of the crankshaft at which the average value $\omega_{AVE(\theta)}$ of the angular velocity at the top dead center is equal to the average value $\omega'_{AVE(\theta)}$ of the angular velocity in the non-misfire state, it becomes possible to easily decide the misfire determination angle at which the threshold determination can be accurately performed, and suitably reduce the design load.

Since the equal misfire determination angle is set for the cylinders 11, the misfire determination angle common to all of the cylinders 11 can be used in the misfire determination program. Therefore, the design load can be reduced while performing the misfire determination accurately.

Although in the present embodiment, the misfire determination angle is set to 540 degrees for the cylinders 11, a difference in a range of ±90 degrees with respect to 540 degrees is allowed, unless the misfire determination accuracy is degraded.

Although in the present embodiment, the crank angle interval from ignition of the first cylinder (#1) to ignition of the second cylinder (#2) is 305 degrees, regarding the expansion interval, it may be in a range of 305 to 315 degrees.

Although in the present embodiment, the determination parameter is $\beta_{(\theta)}$ (formula (6)), it may be an absolute value $|\beta_{(\theta)}|$ of $\beta_{(\theta)}$. Further, the determination parameter may be the average value $\omega_{AVE(\theta)}$ of the angular velocity or an absolute value $|\omega_{AVE(\theta)}|$ of the average value $\omega_{AVE(\theta)}$.

Embodiment 3

Next, Embodiment 3 will be described. In the present embodiment, the engine in which explosion occurs at unequal (irregular) intervals is the inline two-cylinder engine with two cylinders arranged in the straight line in the lateral direction. Hereinafter, the constituents which are the same as those of embodiment 2 will not be described, and differences from Embodiment 2 will be mainly described.

Embodiment 3 is different from Embodiment 2 in that the determination thresholds $D_{(\#1, \#2)}$ for the cylinders 11 (#1, #2) as well as the misfire determination angles for the cylinders 11 (#1, #2) are set to an equal value.

[Principle of Misfire Determination]

Figure 7A:
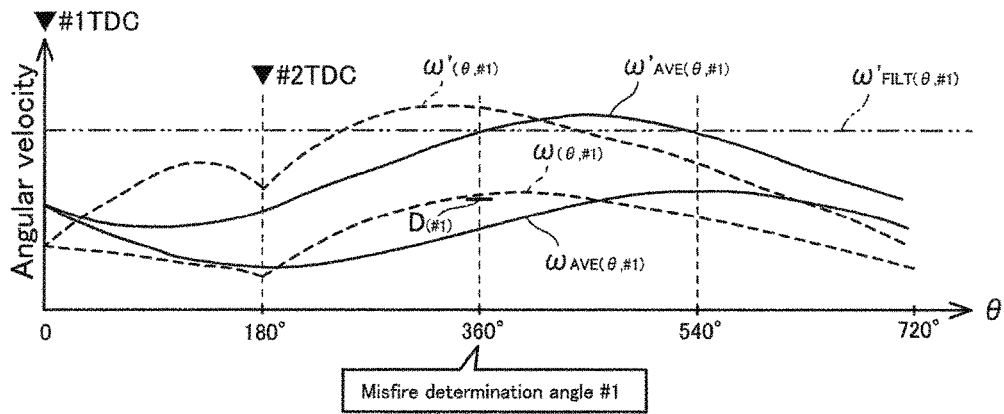
FIGS. 7A to 7C are graphs showing a relation between an angular velocity and a crank angle of an engine (inline two-cylinder engine with two cylinders arranged in a straight line in a lateral direction) according to Embodiment 3.
Figure 7B:
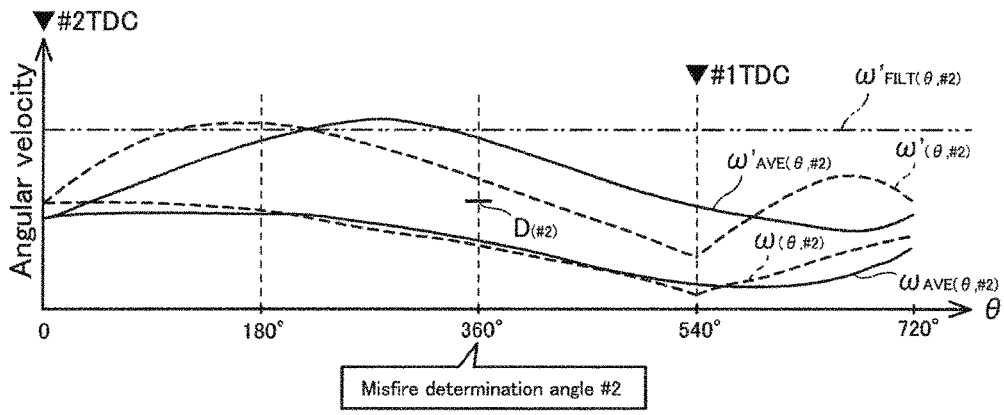
Figure 7C:
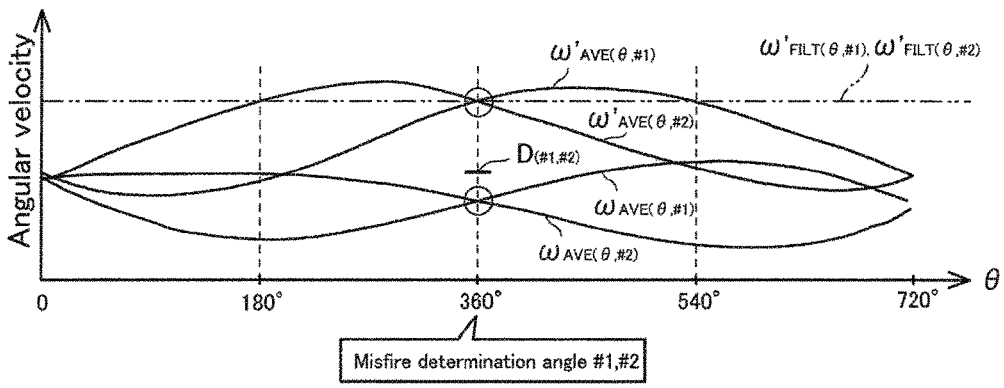

Now, the principle of the misfire determination performed by a misfire determination device 3 according to Embodiment 3 will be described. FIGS. 7A to 7C are graphs each showing a relation between the crank angle and the angular velocity in the normal state (non-misfire state) and in the misfire state of the engine (inline two-cylinder engine with the two cylinders arranged in the straight line in the lateral direction) of the present embodiment. In FIGS. 7A to 7C, broken lines indicate the instantaneous values of the angular velocities, while solid lines indicate the average values of the angular velocities. $\omega'_{(\theta, \#)}$ indicates the instantaneous value of the angular velocity in the normal state. $\omega'_{AVE(\theta, \#)}$ indicates the average value of the angular velocity in the normal state. $\omega_{(\theta, \#)}$ indicates the instantaneous value of the angular velocity in the misfire state. $\omega_{AVE(\theta, \#)}$ indicates the average value of the angular velocity in the misfire state. $D_{(\#)}$ indicates the determination threshold. $\omega'_{FILT(\theta, \#)}$ indicates a reference value (one cycle average value) obtained by averaging the angular velocity in one cycle (720 degrees) in the normal state.

In each of the first and second cylinders 11 (#1, #2), one combustion cycle including four strokes which are intake, compression, expansion and exhaust is performed in cycles of 720 degrees. The expansion stroke occurs at unequal intervals between the cylinders 11.

FIG. 7A shows as a reference the crank angle in a state in which the first cylinder (#1) is at the top dead center. In this example, a crank angle interval from ignition of the first cylinder (#1) to ignition of the second cylinder (#2) is 180 degrees.

FIG. 7B shows as a reference the crank angle in a state in which the second cylinder (#2) is at the top dead center. In this example, a crank angle interval from ignition of the second cylinder (#2) to ignition of the first cylinder (#1) is 540 degrees.

FIG. 7C shows a state in which the average value $\omega'_{AVE(\theta, \#1)}$ of the angular velocity in the normal state, the average value $\omega_{AVE(\theta, \#1)}$ of the angular velocity in the misfire state, and the one cycle average value $\omega'_{FILT(\theta, \#1)}$ of FIG. 7A are superposed on the average value $\omega'_{AVE(\theta, \#2)}$ of the angular velocity in the normal state, the average value $\omega_{AVE(\theta, \#2)}$ of the angular velocity in the misfire state, and the one cycle average value $\omega'_{FILT(\theta, \#2)}$ of FIG. 7B, respectively. As shown in FIG. 7C, a crank angle at which the one cycle average value $\omega'_{FILT(\theta, \#1)}$ or $\omega'_{FILT(\theta, \#2)}$ is equal to the average value $\omega_{AVE(\theta, \#1)}$ or $\omega_{AVE(\theta, \#2)}$ of the angular velocity, respectively, in an interval (180 degrees) less than one cycle in the non-misfire state is set as the misfire determination angle (360 degrees C.) common to the first cylinder (#1) and the second cylinder (#2). In brief, in the present embodiment, the misfire determination angles of all of the cylinders are set to be an equal value.

In the present embodiment, the determination parameter $\omega_{DIFF(\theta)}$ at the misfire determination angle (#1, #2) is represented by the following formula (9):

$$\omega_{DIFF(\theta)} = \omega'_{FILT(\theta,\#)} - \omega_{AVE(\theta,\#)} \quad (9)$$

In a case where the misfire determination target cylinder is the first cylinder (#1), as shown in FIG. 7A, the determination threshold $D_{(\#1)}$ is set at 360 degrees which is the misfire determination angle (#1) of the first cylinder (#1). The determination threshold $D_{(\#1)}$ is compared to the determination parameter $\omega_{DIFF(360)}$. In the misfire determination, the determiner section 32 determines that the misfire has occurred in a case where the determination parameter $\omega_{DIFF(360)}$ is greater than the determination threshold $D_{(\#1)}$, as indicated by the following formula (10):

$$\omega_{DIFF(360)} > D_{(\#1)} \quad (10)$$

In a case where the misfire determination target cylinder is the second cylinder (#2), as shown in FIG. 7B, the determination threshold $D_{(\#2)}$ is set at 360 degrees which is the misfire determination angle (#2) of the second cylinder (#2). The determination threshold $D_{(\#2)}$ is compared to the determination parameter $\omega_{DIFF(\theta)}$. In the misfire determination, the determiner section 32 determines that the misfire has occurred in a case where the determination parameter $\omega_{DIFF(\theta)}$ is greater than the determination threshold $D_{(\#2)}$, as indicated by the following formula (11):

$$\omega_{DIFF(360)} > D_{(\#2)} \quad (11)$$

As shown in FIG. 7C, in the present embodiment, the determination thresholds $D_{(\#1, \#2)}$ at the misfire determination angle (360 degrees) common to the first cylinder (#1) and the second cylinder (#2) are set to be an equal value.

[Misfire Determination Process]

Figure 8A:
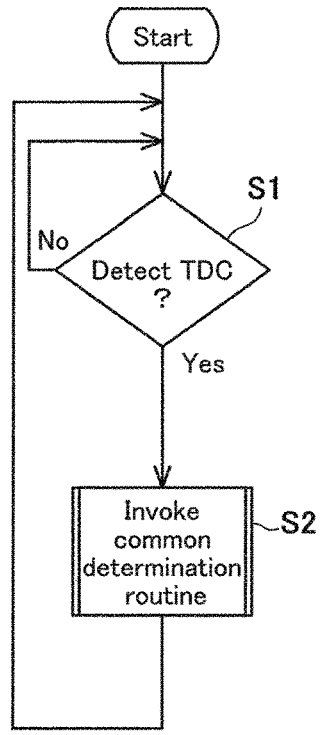
FIGS. 8A and 8B are flowcharts showing a misfire determination process performed by a misfire determination device of FIG. 7.
Figure 8B:
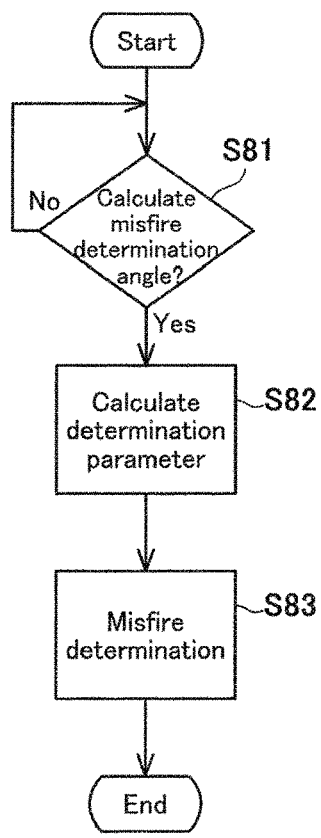

Next, the misfire determination process performed by the misfire determination device 3 of the present embodiment will be described with reference to the flowcharts of FIGS. 8A and 8B. FIG. 8A is the flowchart of a main program, and FIG. 8B is a flowchart of a sub-routine (misfire determination program). Prior to execution of the main program, the misfire determination angles (#1, #2) and the determination thresholds $D_{(\#1, \#2)}$ which are common to all of the cylinders 11 are pre-stored in the memory section 33.

Specifically, in the present embodiment, for the first cylinder (#1) and the second cylinder (#2), the determination thresholds $D_{(\#1, \#2)}$ at the equal misfire determination angle (#1, #2) are set to an equal value. For this reason, unlike the above-described embodiments, the calculation section 31 need not perform processing for identifying the cylinder 11 which is the misfire determination target cylinder, based on the input cylinder identification signal. Instead of this, initially, as shown in FIG. 8A, the calculation section 31 detects the top dead center from the crank angle calculated based on the crank angle signal (step S1). Then, the calculation section 31 initiates the misfire determination process based on the crank angle at the detected top dead center, as a reference (step S2).

Then, as indicated by the sub-routine of FIG. 8B, the calculation section 31 calculates the equal misfire determination angle (360 degrees) common to the first cylinder (#1) and the second cylinder (#2) (step S81). The calculation section 31 counts pulses of a crank angle signal received from the crank angle sensor 22, and calculates the crank angle (θ) with respect to the crank angle at the top dead center, as a reference. In addition, the calculation section 31 calculates the instantaneous value $\omega_{(\theta)}$ of the angular velocity and the average value $\omega_{AVE(\theta)}$ of the angular velocity of the crankshaft 20, based on the crank angle signal. At a time point when the crank angle (θ) has reached the misfire determination angle (360 degrees), the calculation section 31 moves to a next step.

Then, the calculation section 31 calculates the determination parameter $\omega_{DIFF(360)}$ (step S82).

Then, the determiner section 32 determines whether or not the misfire has occurred (step S83). The determiner section 32 compares the determination parameter $\omega_{DIFF(360)}$ to the determination threshold $D_{(\#1, \#2)}$ at the misfire determination angle (360 degrees). The determiner section 32 determines that the misfire has occurred in a case where the determination parameter $\omega_{DIFF(360)}$ is greater than the determination threshold $D_{(\#1, \#2)}$. On the other hand, the determiner section 32 determines that the cylinder is in the normal (non-misfire) state in a case where the determination parameter $\omega_{DIFF(360)}$ is equal to or less than the determination threshold $D_{(\#1, \#2)}$. After the misfire determination, the calculation section 31 returns to step S1 of the main program.

As described above, in the present embodiment, during running of the engine, the sub-routine common to all of the cylinders 11 is executed, the calculation section 31 calculates the determination parameter $\omega_{DIFF(\theta)}$ at the equal (common) misfire determination angle with respect to the crank angle at the top dead center of each cylinder 11 as the reference, and the determiner section 32 compares the determination parameter $\omega_{DIFF(\theta)}$ to the determination threshold $D_{(\#1, \#2)}$ common to all of the cylinders 11, which is pre-stored in the memory section 33, to determine whether or not the misfire has occurred.

In accordance with the present embodiment, for the first cylinder (#1) and the second cylinder (#2), the determination thresholds $D_{(\#1, \#2)}$ as well as the misfire determination angles, are set to an equal value. This makes it possible to further reduce a design load compared to Embodiment 2, while accurately performing the misfire determination.

Since the calculation section 31 calculates the crank angle (θ) at which one cycle average value $\omega'_{FILT(\theta)}$ is equal to the average value $\omega'_{AVE(\theta)}$ of the angular velocity in the non-misfire state, the optimal misfire determination angle (#1, #2) can be decided.

Although in the present embodiment, the misfire determination angle is set to 360 degrees for the cylinders 11 for which the misfire determination is to be performed, a difference in a range of ±90 degrees with respect to 360 degrees is allowed, unless the misfire determination accuracy is degraded.

Further, in an alternative example of the present embodiment, the determination parameter may be an absolute value $|\omega_{DIFF(\theta)}|$.

Embodiment 4

Next, Embodiment 4 will be described. The engine in which explosion occurs at unequal (irregular) intervals of the present embodiment is the inline two-cylinder engine with the two cylinders arranged in the straight line in the lateral direction, as in Embodiment 3. Hereinafter, the constituents which are the same as those of embodiment 3 will not be described, and differences from Embodiment 3 will be mainly described.

Embodiment 4 is different from Embodiment 3 in that the determiner section 32 determines that the cylinder is in the non-misfire (normal) state in a case where the average value of the angular velocity increases in a predetermined interval of the crank angle after the ignition, and determines that the misfire has occurred in the cylinder in a case where the average value of the angular velocity decreases in the predetermined interval of the crank angle after the ignition. A starting point of the predetermined interval is set to a point that is after the ignition of the misfire determination target cylinder and before next ignition of another cylinder. Preferably, an ending point of the predetermined interval is not after the next ignition of another cylinder.

[Principle of Misfire Determination]

Figure 9A:
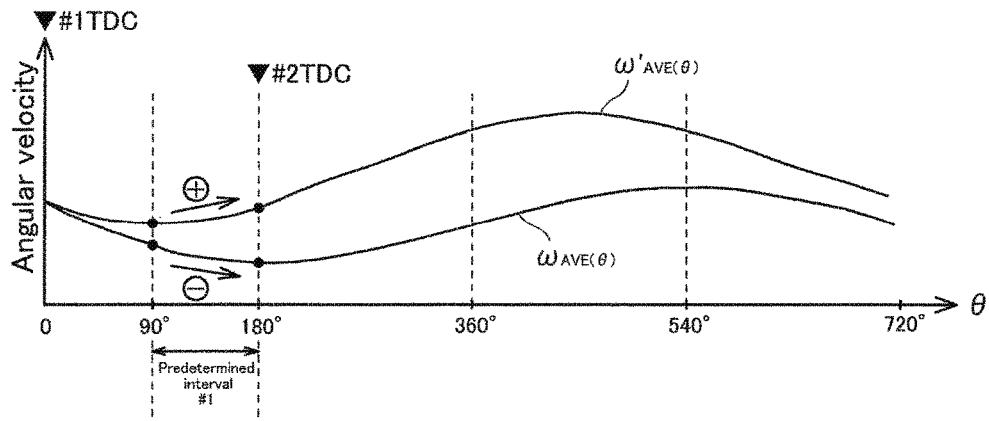
FIGS. 9A and 9B are graphs showing a relation between an angular velocity and a crank angle of an engine (inline two-cylinder engine with two cylinders arranged in the straight line in the lateral direction) according to Embodiment 4.
Figure 9B:
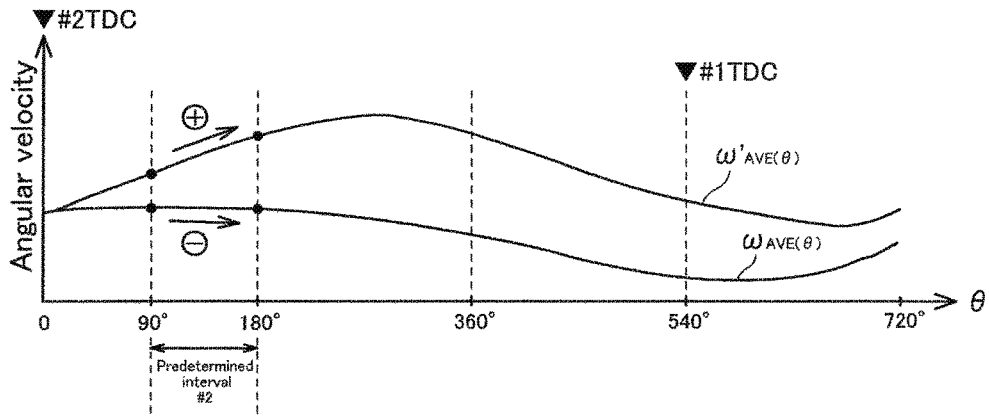

Next, the principle of the misfire determination performed by the misfire determination device 3 of the present embodiment will be described. FIGS. 9A and 9B are graphs showing a relation between the angular velocity and the crank angle of the engine according to Embodiment 4. The graphs show the average value $\omega_{AVE(\theta)}$ of the angular velocity in the normal (non-misfire) state, and the average value $\omega_{AVE(\theta)}$ of the angular velocity in the misfire state.

FIG. 9A indicates as a reference the crank angle in a state in which the first cylinder (#1) is at the top dead center. In this example, a crank angle interval from ignition of the first cylinder (#1) to ignition of the second cylinder (#2) is 180 degrees. FIG. 9B indicates as a reference the crank angle in a state in which the second cylinder (#2) is at the top dead center. In this example, a crank angle interval from ignition of the second cylinder (#2) to ignition of the first cylinder (#1) is 540 degrees.

In FIGS. 9A and 9B, an attention is paid to the average value of the angular velocity of the present embodiment, namely, a rotational change of the engine. Regarding each of the first cylinder (#1) and the second cylinder (#2), a noticeable difference in a change of the angular velocity in the interval of the angle θ from 90 degrees to 180 degrees with respect to the crank angle at the top dead center as the reference, can be observed, the difference being generated depending on occurrence or non-occurrence of the misfire.

Specifically, within the above-described interval, the average value $\omega'_{AVE(\theta)}$ of the angular velocity in the normal (non-misfire) state increases (a slope of the average value $\omega'_{AVE(\theta)}$ has a positive value), and the average value $\omega_{AVE(\theta)}$ of the angular velocity in the misfire state decreases (a slope of the average value $\omega_{AVE(\theta)}$ has a negative value). Therefore, it can be determined whether or not the misfire has occurred in the cylinder 11, depending on whether or not the average value $\omega_{AVE(\theta)}$ of the angular velocity decreases. Accordingly, in the present embodiment, the determination parameter $\omega_{slope(\Delta\theta)}$ is represented by the following formula (12). Δθ indicates the crank angle interval within the predetermined interval. θ1 indicates the crank angle with respect to the crank angle at the top dead center indicating the starting point of the predetermined interval. θ2 indicates the crank angle with respect to the crank angle at the top dead center indicating the ending point of the predetermined interval.

$$\omega_{slope(\Delta\theta)} = (\omega_{AVE(\theta2)} - \omega_{AVE(\theta1)})/(\theta2 - \theta1) \quad (12)$$

As shown in FIG. 9A, in a case where the misfire determination target cylinder is the first cylinder (#1), the determination parameter $\omega_{slope(\Delta\theta)}$ in the interval from 90 degrees (θ1) to 180 degrees (θ2) is represented by the following formula (13). In this way, in a case where the determination parameter has a negative value, it can be determined that the misfire has occurred in the first cylinder (#1).

$$\omega_{slope(\Delta\theta)} = (\omega_{AVE(108)} - \omega_{AVE(90)})/(180-90) \quad (13)$$

As shown in FIG. 9B, in a case where the misfire determination target cylinder is the second cylinder (#2), the determination parameter $\omega_{slope(\Delta\theta)}$ in the interval from 90 degrees (θ1) to 180 degrees (θ2) is represented by the following formula (13), as in the case of the first cylinder (#1). In this way, in a case where the determination parameter has a negative value, it can be determined that the misfire has occurred in the second cylinder (#2), as in the case of the first cylinder (#1).

In summary, in the present embodiment, the calculation section 31 calculates the determination parameter in the common predetermined interval of the crank angle with respect to the crank angle at the top dead center as the reference, and the determiner section 32 determines whether or not the misfire has occurred by determining whether the calculated determination parameter has a positive value or a negative value, irrespective of whether the misfire determination target cylinder is the first cylinder (#1) or the second cylinder (#2).

[Misfire Determination Process]

Figure 10A:
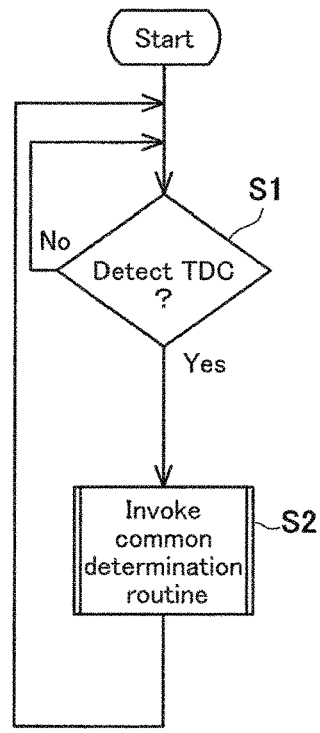
FIGS. 10A and 10B are flowcharts showing a misfire determination process performed by a misfire determination device of FIG. 9.
Figure 10B:
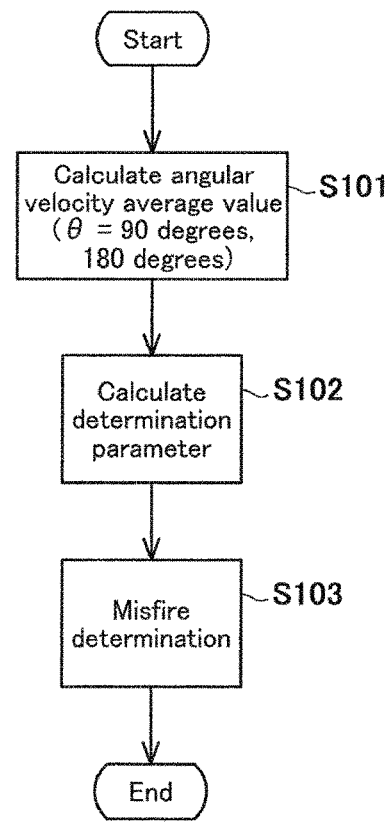

Next, the misfire determination process performed by the misfire determination device 3 of the present embodiment will be described with reference to the flowcharts of FIGS. 10A and 10B. FIG. 10A is the flowchart of a main program, and FIG. 10B is a flowchart of a sub-routine (misfire determination program).

The calculation section 31 calculates the determination parameter $\omega_{slope(\Delta\theta)}$ at the crank angle interval $\Delta\theta$ common to the first cylinder (#1) and the second cylinder (#2). For this reason, the calculation section 31 need not perform processing for identifying the misfire determination target cylinder 11 based on the cylinder identification signal. Instead of this, initially, as shown in FIG. 10A, the calculation section 31 detects the top dead center from the crank angle calculated based on the crank angle signal (step S1).

Then, the calculation section 31 initiates the misfire determination process based on the crank angle at the detected top dead center, as a reference (step S2).

Then, the calculation section 31 calculates the average value $\omega_{AVE(90)}$ of the angular velocity at the crank angle $\theta$ of 90 degrees and the average value $\omega_{AVE(180)}$ of the angular velocity at the crank angle $\theta$ of 180 degrees (step S101). Specifically, the calculation section 31 counts pulses of the crank angle signal received from the crank angle sensor 22, and calculates the crank angle $\theta$ with respect to the crank angle at the top dead center, as the reference. At a time point when the crank angle $\theta$ has reached 90 degrees, the calculation section 31 calculates the average value $\omega_{AVE(90)}$ of the angular velocity based on the crank angle signal. At a time point when the crank angle $\theta$ has reached 180 degrees, the calculation section 31 calculates the average value $\omega_{AVE(180)}$ of the angular velocity based on the crank angle signal.

Then, the calculation section 31 calculates the determination parameter $\omega_{slope(\Delta\theta)}$ (step S102). According to the formula (13), the calculation section 31 calculates the determination parameter $\omega_{slope(\Delta\theta)}$ based on the average value $\omega_{AVE(90)}$ of the angular velocity at the crank angle $\theta$ of 90 degrees and the average value $\omega_{AVE(180)}$ of the angular velocity at the crank angle $\theta$ of 180 degrees.

Then, the determiner section 32 performs the misfire determination (step S103). The determiner section 32 determines whether the determination parameter $\omega_{slope(\Delta\theta)}$ calculated in step S102 has a positive value or a negative value, and determines that the misfire has occurred in a case where the determination parameter $\omega_{slope(\Delta\theta)}$ has a negative value. On the other hand, the determiner section 32 determines that the cylinder is in the normal (non-misfire) state in a case where the determination parameter $\omega_{slope(\Delta\theta)}$ is zero or has a positive value. After the misfire determination, the process returns to step S1 of the main program.

As described above, in the present embodiment, during running of the engine, the sub-routine common to all of the cylinders 11 is executed, and the calculation section 31 calculates the determination parameter $\omega_{slope(\Delta\theta)}$ in the common crank angle interval $\Delta\theta$ with respect to the crank angle at the top dead center of each cylinder 11 as the reference, and the determiner section 32 determines whether or not the misfire has occurred by determining whether the calculated determination parameter $\omega_{slope(\Delta\theta)}$ has a positive value or a negative value.

In accordance with the present embodiment, in a case where no misfire has occurred, the value associated with the angular velocity after the ignition increases in the predetermined crank angle interval $\Delta\theta$, while in a case where the misfire has occurred, the value associated with the angular velocity after the ignition decreases in the predetermined crank angle interval $\Delta\theta$. Since the determiner section 32 can easily perform the misfire determination depending on whether the determination parameter has a negative value or a positive value. This can eliminate a need to set the threshold for each engine or for each of the cylinders 11.

Although in the present embodiment, the determiner section 32 performs the misfire determination based on the change in the average value of the angular velocity (the average value of the generated torque amount), in the misfire determination, the determiner section 32 may determine that the misfire has occurred in a case where an angular acceleration rate or torque decreases.

In the misfire determination of the present embodiment, the determination threshold is not used. For example, as shown in FIG. 9B, in a case where the misfire determination target cylinder is the second cylinder (#2), the average value of the angular velocity decreases a little within the set interval. Therefore, the value of the determination parameter of the formula (12) is approximately zero. In view of this, the slope (positive value) of the average value $\omega'_{AVE(\theta)}$ of the angular velocity in the normal state in the above interval is pre-stored as the determination threshold $D_{(\#2)}$. In the misfire determination, the determiner section 32 may compare the determination parameter $\omega_{slope(180\text{-}90)}$ to the determination threshold $D_{(\#2)}$, and determine that the misfire has occurred, in a case where determination parameter $\omega_{slope(180\text{-}90)}$ is less than the determination threshold $D_{(\#2)}$. By performing the misfire determination by use of the determination threshold in this way, accuracy of the misfire determination can be improved.

Although in the present embodiment, the determiner section 32 determines whether or not the average value of the angular velocity decreases in the interval of the crank angle from 90 degrees to 180 degrees, at a time point immediately after the ignition, the interval within which the determiner section 32 determines whether or not the average value of the angular velocity decreases is not limited.

The misfire determination process of the present embodiment may be combined with any of the misfire determination processes of Embodiment 1 to Embodiment 3. Thus, accuracy of the misfire determination can be improved.

Although the engine of the present embodiment is the inline two-cylinder engine with the two cylinders arranged in the straight line in the lateral direction, the engine may be a V-type four cylinder engine, an inline four-cylinder engine with the four cylinders arranged in the straight line in the longitudinal direction, or multi-cylinder engines of other forms.

In the engine in which explosion occurs at equal intervals, as well as the engine in which explosion occurs at unequal intervals, it is assumed that the value associated with the angular velocity in the predetermined interval of the crank angle immediately after the ignition shows a noticeable difference in a change trend depending on occurrence or non-occurrence of the misfire. In other words, the misfire determination method of the present embodiment is applicable to the engine in which explosion occurs at equal intervals and the single-cylinder engine.

Other Embodiment

Although in the above-described embodiments, the average value of the generated torque correlation amount in the interval less than one cycle of the engine 1 is the average value of the generated torque correlation amount (angular velocity) in the interval of 180 degrees less than one cycle, this is exemplary. The average value of the generated torque correlation amount may be in, for example, an interval which is equal to or greater than 90 degrees and equal to or less than 360 degrees may be used, so long as the interval is less than one cycle.

Although in the above-described embodiments, the average value of the generated torque correlation amount is the average value of the angular velocity, the average value of the angular acceleration rate may be used.

Although in the above-described embodiments, the determination threshold is set based on the average value of the angular velocity, it may be set based on a rotational speed and a load. There is a tendency that a rotational change increases as the rotational speed decreases. Also, there is a tendency that the rotational change increases as the load increases.

Numerous improvements and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The present invention is effectively applicable to a vehicle including an engine in which explosion occurs at unequal (irregular) intervals.

LIST OF REFERENCE CHARACTERS 1 engine
2 ECU (electronic control unit)
3 misfire determination device
11 cylinder
12 piston
13 combustion chamber
14 air-intake pipe
15 exhaust pipe
16 intake valve
17 exhaust valve
18 fuel injection valve
19 ignition plug
20 crankshaft
21 rotation detection rotor
22 crank angle sensor
100 engine control system
$\omega'_{(\theta)}$ instantaneous value of angular velocity in normal (non-misfire) state
$\omega'_{AVE(\theta)}$ average value of angular velocity in normal state
$\omega_{(\theta)}$ instantaneous value of angular velocity in misfire state
$\omega_{AVE(\theta)}$ average value of angular velocity in misfire state
$\omega'_{FILT(\theta)}$ average value of angular velocity in one cycle in normal state
$D_{(\#)}$ determination threshold

The invention claimed is:
1. A misfire determination device of an engine in which explosion occurs at unequal intervals, the engine including a plurality of cylinders and a crankshaft which is angularly displaced at a different angle between expansion strokes, the misfire determination device being configured to:
calculate a generated torque correlation amount correlated with torque generated in the crankshaft, based on an angular position signal of the crankshaft, and
perform misfire determination, based on an average value of the generated torque correlation amount in an interval less than one cycle of the engine, at an angular position of the crankshaft which is different from an angular position of the crankshaft at an ignition timing,
wherein the angular position of the crankshaft at which the misfire determination is performed is set for each of the plurality of cylinders for which the misfire determination is to be performed, and angular positions corresponding to the plurality of cylinders respectively have values different from each other.

2. The misfire determination device according to claim 1, wherein the angular position of the crankshaft at which the misfire determination is performed is set to be smaller as a crank angle interval between the expansion strokes is smaller.

3. The misfire determination device according to claim 1, wherein a threshold to be compared to the average value of the generated torque correlation amount is set for each of the plurality of cylinders for which the misfire determination is to be performed, and thresholds corresponding to the plurality of cylinders have values different from each other.

4. The misfire determination device according to claim 3, being configured to determine that misfire has occurred, in a case where the average value of the generated torque correlation amount is equal to or less than the threshold,
wherein the threshold is set to be greater as a crank angle interval between the expansion strokes is smaller.

5. A misfire determination device of an engine in which explosion occurs at unequal intervals, the engine including a plurality of cylinders and a crankshaft which is angularly displaced at a different angle between expansion strokes, the misfire determination device being configured to:
calculate a generated torque correlation amount correlated with torque generated in the crankshaft, based on an angular position signal of the crankshaft, and
perform misfire determination, based on an average value of the generated torque correlation amount in an interval less than one cycle of the engine, at an angular position of the crankshaft which is different from an angular position of the crankshaft at an ignition timing,
wherein the angular position of the crankshaft at which the misfire determination is performed is set to be equal between the plurality of cylinders, and
wherein the misfire determination device is configured to perform the misfire determination by comparing a determination parameter, including the average value of the generated torque correlation amount, to a preset threshold at the angular position of the crankshaft at which a reference value, obtained by averaging the generated torque correlation amount in one cycle, is equal to the average value of the generated torque correlation amount in the interval less than one cycle in a non-misfire state.

6. A misfire determination device of an engine in which explosion occurs at unequal intervals, the engine including a plurality of cylinders and a crankshaft which is angularly displaced at a different angle between expansion strokes, the misfire determination device being configured to:
calculate a generated torque correlation amount correlated with torque generated in the crankshaft, based on an angular position signal of the crankshaft, perform misfire determination, based on an average value of the generated torque correlation amount in an interval less than one cycle of the engine, at an angular position of the crankshaft which is different from an angular position of the crankshaft at an ignition timing, and determine that misfire has not occurred in a case where the average value of the generated torque correlation amount in the interval less than one cycle of the engine increases in a predetermined interval of the angular position of the crankshaft after ignition, and that the misfire has occurred in a case where the average value of the generated torque correlation amount in the interval less than one cycle of the engine decreases in the predetermined interval of the angular position of the crankshaft after the ignition.

\* \* \* \* \*